US011710329B2

(12) United States Patent
Miyauchi

(10) Patent No.: US 11,710,329 B2
(45) Date of Patent: Jul. 25, 2023

(54) IMAGE PROCESSING APPARATUS WITH AUTOMATED REGISTRATION OF PREVIOUSLY ENCOUNTERED BUSINESS FORMS, IMAGE PROCESSING METHOD AND STORAGE MEDIUM THEREFOR

(71) Applicant: CANON KABUSHIKI KAISHA, Tokyo (JP)

(72) Inventor: Takashi Miyauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/714,646

(22) Filed: Apr. 6, 2022

(65) Prior Publication Data

US 2022/0327850 A1    Oct. 13, 2022

(30) Foreign Application Priority Data

Apr. 13, 2021 (JP) .................................. 2021-067973

(51) Int. Cl.
*G06V 30/412* (2022.01)
*H04N 1/00* (2006.01)
*G06F 40/174* (2020.01)
*G06V 30/414* (2022.01)

(52) U.S. Cl.
CPC .......... *G06V 30/412* (2022.01); *G06F 40/174* (2020.01); *G06V 30/414* (2022.01); *H04N 1/00424* (2013.01); *H04N 1/00427* (2013.01); *H04N 1/00766* (2013.01)

(58) Field of Classification Search
None
See application file for complete search history.

(56) References Cited

U.S. PATENT DOCUMENTS

2019/0286692 A1*  9/2019  Odate .................... G06F 40/103
2021/0286991 A1*  9/2021  Miyauchi ................ G06F 18/22

FOREIGN PATENT DOCUMENTS

JP          2019-159898         9/2019

* cited by examiner

*Primary Examiner* — Andrew H Lam
(74) *Attorney, Agent, or Firm* — Venable LLP

(57) ABSTRACT

The image processing apparatus has an obtaining unit configured to obtain a scanned image, a first determination unit configured to determine a document type of a document format similar to a document format of the scanned image based on information on each registered document type, an extraction unit configured to extract a character string corresponding to a predetermined item, a second determination unit configured to use a different method for determining whether the document format indicated by the scanned image is similar to the document format of the document type determined by the first determination unit in a case where a user modifies the extracted character string, and a display control unit configured to display a screen prompting the user to perform overwriting in a case where the second determination unit determines that the document format is similar.

15 Claims, 17 Drawing Sheets

FIG.6A

Quotation

To:  Date:2019/04/01
XXX-XXX-XXXX  #: 1234
hijk Imn Co.

| ID | Description | Quantity | Line Total |
|----|-------------|----------|------------|
| P01 | Product1 | 5 | 150.00 |
| P02 | Product2A | 2 | 100.00 |
| P03 | Product3 | 4 | 200.00 |

Total  450.00

Sender:
XXX-XXX-XXXX
ABC Co.

Notes:

FIG.10A REGISTERED DOCUMENT

FIG.10B INPUT DOCUMENT 1

FIG.10C INPUT DOCUMENT 2

FIG.10D INPUT DOCUMENT 3

Document Registration Screen

Order of degree of similarity
None

| Quotation_ABC |
|---|
| Quotation_DEF |
| Bill_XYZ |

Registered document: Quotation_ABC

```
        Quotation
                          Date:2019/04/01
To:                       #:1234
XXX-XXX-XXXX
hijk Inn Co.

ID  Description  Quantity  Line Total
P01 Product1     5         150.00
P02 Product2A    2         100.00
P03 Product3     4         200.00
                 Total     450.00
Notes:
                 Sender:
                 XXX-XXX-XXXX
                 ABC Co.
```

Input image — 1400, 1401

```
        Quotation
                          Date:2019/04/03
To:                       Valid Until:2019/07/02
XXX-XXX-XXXX              #:1258
hijk Inn Co.

ID  Description  Quantity  Line Total
P01 Product1     4         120.00
P04 Product4     1         50.00
P05 Product5     2         100.00
                 Total     270.00
Notes:
                 Sender:
                 XXX-XXX-XXXX
                 ABC Co.
```

Preview setting
○ Display index position
● Highlight difference

● Perform overwriting registration   Registration name : Quotation_ABC
○ Perform new registration            Registration name :
○ Not perform registration

[Determine]

| Date of Scan | {title} | {sender} | {number} | {total_price} |
|---|---|---|---|---|
| 2019/04/01 | "Quotation" | "ABC Co." | 1234 | 450.00 |
| 2019/04/02 | "Quotation" | "ABC Co." | 1240 | 120.00 |
| 2019/04/10 | "Quotation" | "ABC Co." | 1242 | 1,080.00 |
| 2019/05/09 | "Quotation" | "ABC Co." | 1245 | 450.00 |
| ... | ... | ... | ... | ... |
| Type | Fixed character string type | Fixed character string type | Estimation type | Numerical value type |
| Details | "Quotation" | "ABC Co." | #### | - |

1601 — data rows; 1602 — Type row; 1603 — Details row

FIG.16

|  | {title} | {sender} | {number} | {total_price} |
|---|---|---|---|---|
| 1701 — Type | Fixed character string type | Fixed character string type | Estimation type | Numerical value type |
| 1702 — Details | "Quotation" | "ABC Co." | #### | - |
| 1703 — Input document 1 | "Quotation" | "ABC Co." | 1258 | 270.00 |
| 1704 — Input document 2 | "Quotation" | "LMN Co." | Q-258 | 360.00 |

1705 — {sender} column values; 1706 — {number} column values

IMAGE PROCESSING APPARATUS WITH AUTOMATED REGISTRATION OF PREVIOUSLY ENCOUNTERED BUSINESS FORMS, IMAGE PROCESSING METHOD AND STORAGE MEDIUM THEREFOR

BACKGROUND OF THE DISCLOSURE

Field of the Disclosure

The present disclosure relates to a technique to extract an index included in an image.

Description of the Related Art

There is a method in which information on documents is registered in advance and whether a document corresponding to a scanned image is included in a registered document group is determined. Further, there is a method in which in a case where a document corresponding to a scanned image is specified, based on position information on a character string associated with the specified document, a desired character string for setting a property is extracted from the scanned image and the desired character string is presented to a user.

Japanese Patent Laid-Open No. 2019-159898 has described a method in which a template is selected by comparing all the registered templates and reading results of a document and a character string representing an attribute, such as a billed amount, is extracted from the reading results based on the selected template.

In a case where a user modifies a character string because the extracted character string is not the desired character string, a method of overwriting information on a registered document based on the scanned image is conceivable. By overwriting the information on the registered document, even in a case where the layout of a document that is issued from a certain company is changed, next time, it is possible to extract a desired character string from the scanned image of the document whose type is the same as that of the document.

Further, there is a case where an unregistered document is scanned, whose character string layout is similar to that of a certain registered document but which is issued from a different company. In this situation, there is a case where even though it should be determined that the document corresponding to the scanned image is not registered, the registered document is specified as the document corresponding to the scanned image. In a case where an erroneous document is specified, a character string different from the desired character string is extracted, and therefore, the extracted character string is modified by a user. Because of this, there is a possibility that the information on the registered document is erroneously overwritten based on the scanned image. In a case where the information on the registered document is erroneously overwritten, there is a possibility that the extraction of a desired character string fails at the next time of scanning a document and performing processing to extract a desired character string based on the scanned document.

SUMMARY OF THE DISCLOSURE

The image processing apparatus of the present disclosure has an obtaining unit configured to obtain a scanned image obtained by scanning a document; a first determination unit configured to determine a document type of a document format similar to a document format of the scanned image based on information on each document type registered in advance; an extraction unit configured to extract a character string corresponding to a predetermined item for setting a property about the scanned image based on information on the document type of the scanned image determined by the first determination unit, the character string being included in the scanned image; a second determination unit configured to determine, by using a method which is different from a method used by the first determination unit, whether the document format of the scanned image is similar to a document format of the document type determined by the first determination unit in a case where a user modifies the extracted character string; and a display control unit configured to display a screen prompting the user to instruct to perform overwriting of the information on the registered document type in a case where the second determination unit determines that the document format of the scanned image is similar to the document format of the document type determined by the first determination unit.

Further features of the present disclosure will become apparent from the following description of exemplary embodiments with reference to the attached drawings.

BRIEF DESCRIPTION OF THE DRAWINGS

FIG. 6A and FIG. 6B are diagrams showing an example of block selection processing;

FIG. 8 is a diagram showing an example of confirmation/modification processing;

FIG. 10A to FIG. 10D are diagrams showing examples of a registered document and input documents;

FIG. 14 is a diagram showing an example of the document registration screen;

FIG. 16 is a diagram for explaining a character string type; and

FIG. 17 is a diagram for explaining similarity determination based on a character string type.

DESCRIPTION OF THE EMBODIMENTS

In the following, with reference to the attached drawings, embodiments are explained in detail. The following embodiments are not intended to limit the technique of the present disclosure according to the claims and all combinations of features explained in the present embodiments are not necessarily indispensable to the solution of the technique of the present disclosure.

First Embodiment

In the present embodiment, processing to extract a character string (in the following, also called index) of a predetermined item included in a scanned image obtained by scanning a paper document (input document), such as a business form, with a reading device is explained. In order to extract an index from the contents of the scanned image, documents are registered in advance and an extraction area in which an index is extracted is set for each document. Then, after determining which registered document the input document corresponds to (is similar to), by performing OCR processing partially for the corresponding extraction area within the scanned image, the index is extracted.

Further, in a case where the input document is an unregistered document, there is a function to register the input document as a new document. Furthermore, there is a function to overwrite information on the corresponding registered document based on the input document. By these function, it is possible to appropriately update the registered document. Because of this, for example, it is possible to cope with a case where the client company changes or a case where the client company changes the format of a document.

However, even though the input document is an unregistered document different from each registered document group, there is a case where the input document is determined to be similar to one of the registered document groups. In such a case, there is a possibility that the information on the registered document is overwritten based on the input image. In a case where the information relating to the registered document is overwritten based on the document different from the registered document, next time, there is a possibility that the index extraction fails at the time of performing the index extraction by scanning a document whose type is the same as that of the registered document.

Consequently, in the present embodiment, a method of appropriately recommending new registration or overwriting to a user in accordance with the input document is explained.

[System Configuration]

Figure 1:
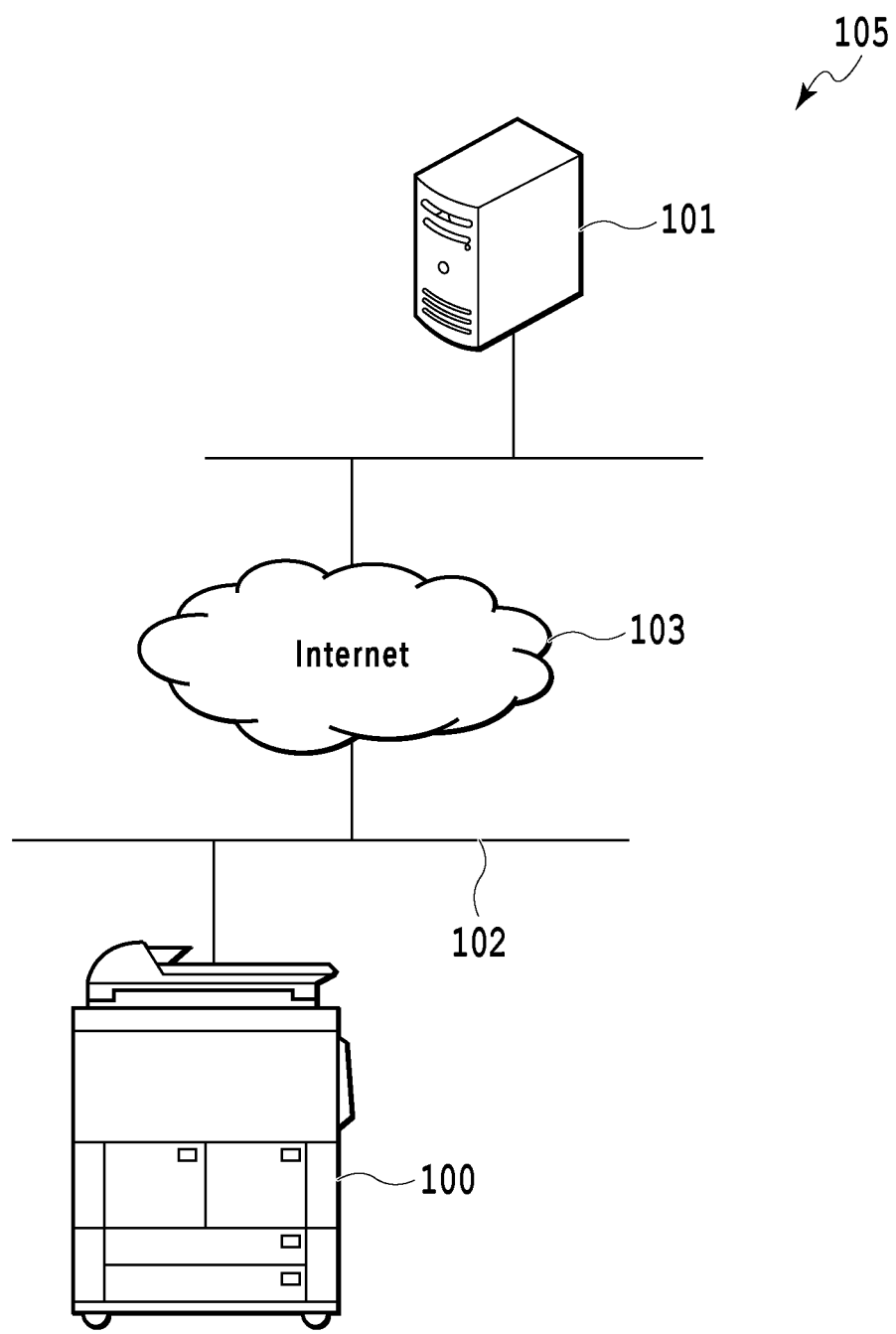
FIG. 1 is a diagram showing a configuration example of a system.

FIG. 1 is a diagram showing the general configuration of a system to which the present embodiment can be applied. A system 105 of the present embodiment has an image forming apparatus 100 and a terminal 101. As shown in FIG. 1, the image forming apparatus 100 is connected to a LAN 102 and capable of communicating with the terminal 101, such as a PC, via Internet 103 or the like. In the present embodiment, it may also be possible to omit the terminal 101 and the configuration may be one including only the image forming apparatus 100.

The image forming apparatus 100 is an multifunction peripheral (MFP) having a display/operation unit 123 (see FIG. 2), a scanner unit 122 (see FIG. 2), a printer unit 121 (see FIG. 2) and the like. It is possible to utilize the image forming apparatus 100 as a scan terminal that scans a document original by using the scanner unit 122. Further, the image forming apparatus 100 has the display/operation unit 123, such as s touch panel and a hard button, and displays recommendation results of a file name and a storage destination and displays a user interface for receiving instructions from a user.

[Hardware Configuration of Image Forming Apparatus (100)]

Figure 2:
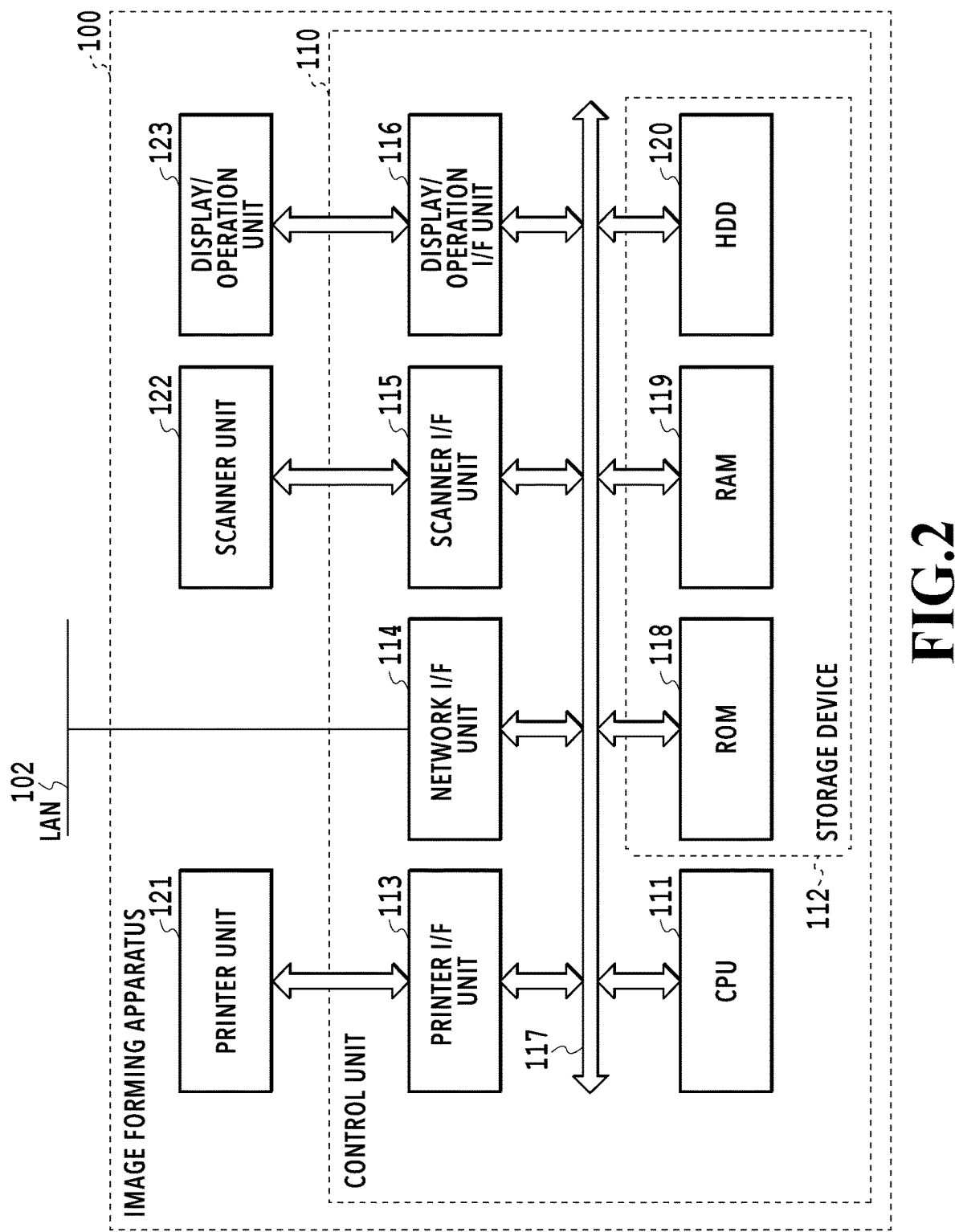
FIG. 2 is a diagram showing a hardware configuration example of an image forming apparatus.

FIG. 2 is a block diagram showing the hardware configuration of the image forming apparatus 100. The image forming apparatus 100 of the present embodiment has the display/operation unit 123, the scanner unit 122, the printer unit 121, and a control unit 110.

The control unit 110 has a CPU 111, a storage device 112 (a ROM 118, a RAM 119, an HDD 120), a printer I/F unit 113, a network I/F unit 114, a scanner I/F unit 115, and a display/operation I/F unit 116. Further, in the control unit 110, each unit is connected so as to be capable of communicating with one another via a system bus 117. The control unit 110 controls the operation of the entire image forming apparatus 100.

The CPU 111 functions as a unit configured to perform each piece of processing, such as reading control, image processing, and display control in a flowchart, to be described later, by reading and executing control programs stored in the storage device 112.

The storage device 112 stores and retains control programs, image data, metadata, setting data, processing results data and the like. The storage device 112 includes the ROM 118, which is a nonvolatile memory, the RAM 119, which is a volatile memory, the HDD 120, which is a large-capacity storage area, and the like. The ROM 118 is a nonvolatile memory that retains control programs and the like and the CPU 111 performs control by reading the control programs. The RAM 119 is a volatile memory that is used as a temporary storage area, such as a main memory and a work area, of the CPU 111.

The network I/F unit 114 connects the control unit 110 (image forming apparatus 100) to the LAN 102 via the system bus 117. The network I/F unit 114 transmits image data to an external device on the LAN 102, receives various kinds of information from an external device on the LAN 102, and so on.

The scanner I/F unit 115 connects the scanner unit 122 and the control unit 110 via the system bus 117. The scanner unit 122 generates scanned image data by reading a document original and inputs the scanned image data to the control unit 110 via the scanner I/F unit 115. The scanner unit 122 comprises a document feeder and makes it possible to successively read a plurality of documents placed on a tray by feeding them one by one.

The display/operation I/F unit 116 connects the display/operation unit 123 and the control unit 110 via the system bus 117. In the display/operation unit 123, a liquid crystal display unit having a touch panel function, a hard button and the like are provided.

The printer I/F unit 113 connects the printer unit 121 and the control unit 110 via the system bus 117. The printer unit 121 receives image data generated by the CPU 111 via the printer I/F unit 113 and print processing onto printing paper is performed by using the received image data. As above, it is possible for the image forming apparatus 100 according to the present embodiment to provide the image processing function with the above-described hardware configuration.

[Function Configuration of Image Forming Apparatus]

Figure 3:
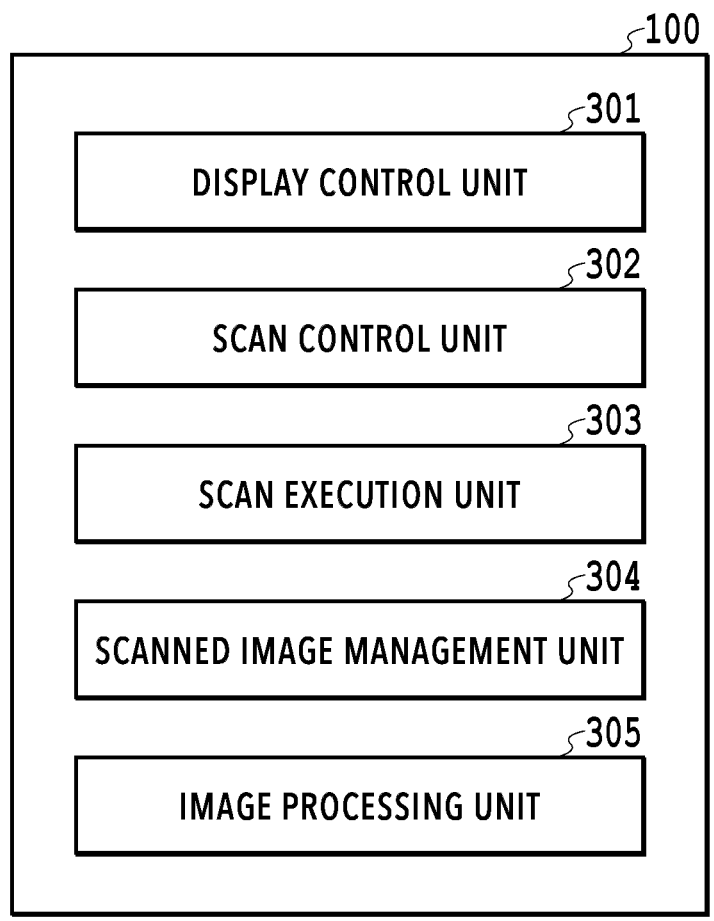
FIG. 3 is a diagram showing a function configuration of the image forming apparatus.

FIG. 3 is a block diagram showing the function configuration of the image forming apparatus 100. In FIG. 3, among the various functions of the image forming apparatus 100, the functions relating to the functions pertaining the processing from computerizing (filing) a document original by performing a scan until saving are shown.

A display control unit 301 displays a user interface screen (UI screen) for receiving various user operations on the touch panel of the display/operation unit 123. The various user operations include, for example, scan setting, instructions to start a scan, instructions to modify an index, instructions for the registration method, file name setting, instructions to save a file, and the like.

A scan control unit 302 gives instructions to perform scan processing to a scan execution unit 303 along with information on scan setting in accordance with a user operation (for example, pressing down of "start scan" button) performed on the UI screen. The scan execution unit 303 generates scanned image data by causing the scanner unit 122 to perform the document original reading operation via the scanner I/F unit 115 in accordance with the instructions to perform scan processing from the scan control unit 302. The generated scanned image data is saved in the HDD 120 by a scanned image management unit 304.

An image processing unit 305 performs image modification processing, such as rotation and inclination correction, in addition to image analysis processing, such as text block detection processing, OCR processing (character recognition processing), and similar document determination processing, for the scanned image data. By means of the image processing unit 305, the image forming apparatus 100 functions also as an image processing apparatus. The character string area that is detected from the scanned image is also called "text block". Details of the image processing will be described later.

The function of each unit in FIG. 3 is implemented by the CPU of the image forming apparatus 100 loading programs stored in the ROM onto the RAM and executing the programs. It may also be possible to implement part or all of the functions of each unit in FIG. 3 by hardware, such as an ASIC and an electronic circuit.

[Flowchart of File Generation Processing of Scanned Image]

The entire processing is explained in which the image forming apparatus 100 reads a document original, performs image processing for the scanned image on the first page of the document original, generates a file name by utilizing a character string included in the scanned image, and recommends the file name to a user through the display/operation unit 123.

Figure 4:
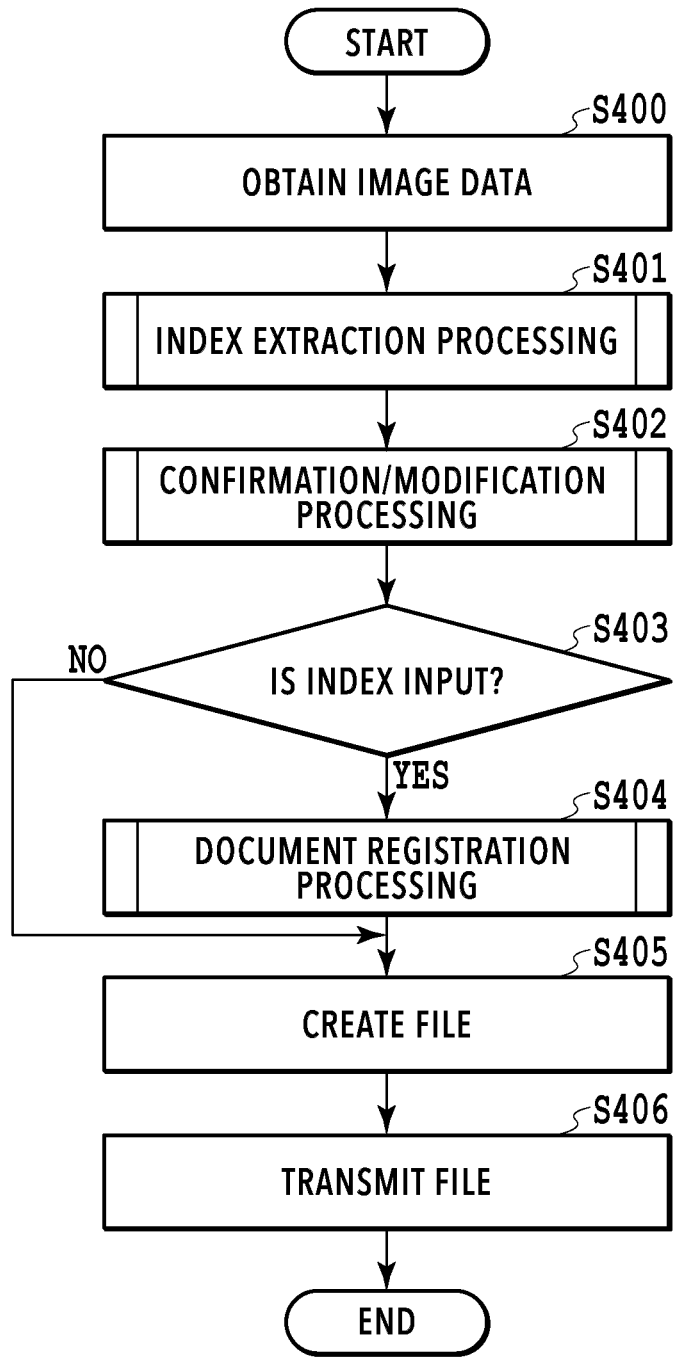
FIG. 4 is a flowchart of file generation processing of a scanned image.

The series of processing shown by the flowchart in FIG. 4 is performed by the CPU of the image forming apparatus 100 loading program codes stored in the ROM onto the RAM and executing the program codes. Further, it may also be possible to implement part or all of the functions of the steps in FIG. 4 by hardware, such as an ASIC and an electronic circuit. Symbol "S" in the explanation of each piece of processing means that the step is a step in the flowchart and this also applies to subsequent flowcharts.

At S400, upon receipt of scan instructions of a user via the display/operation unit 123, the scan control unit 302 causes the scan execution unit 303 to perform reading (scan) of a plurality of document originals one by one from the tray of the document feeder of the scanner unit 122. Then, the scan control unit 302 obtains image data of the image (called scanned image or input image) obtained as a result of a scan.

At S401, the image processing unit 305 performs processing (index extraction processing) to extract an index included in the scanned image based on an index extraction rule by analyzing the image data obtained at S400. The "index" is a character string representing a predetermined item, such as the title of a document, a management number, and a company name. In the present embodiment, the index is used for setting a part of a file name or a property, such as metadata, at the time of saving a scanned image. Details of the index extraction processing at this step will be described later by using FIG. 5.

The use method of the index is not limited to generation of a file name or extraction of metadata. The index may also be used for setting another property, such as a folder path. That is, the file name and metadata are one kind of information that is set as a property (attribute) relating to scanned image data.

At S402, the display control unit 301 displays Confirmation/Modification Screen 800 (see FIG. 8) including the index extracted at S401 and the file name and metadata generated by using the index on the display/operation unit 123. Via Confirmation/Modification Screen 800, properties that are set to the scanned image, such as the index, the file name, and the metadata, are presented (recommended) to a user. Further, the display control unit 301 receives an input of modification of the extracted index from a user. Upon receipt of the input of modification from a user via the display/operation unit 123, the display control unit 301 presents the file name and metadata based on the modified index.

In a case where the confirmation of a user for the file name and metadata presented by the display control unit 301 is received, the presented file name is set as the file name of the scanned image. The confirmation/modification processing will be described later.

At S403, the image processing unit 305 determines whether an index is input via the display/operation unit 123. For example, in a case where the extracted index is modified to another character string by a user, it is determined that an index is input. Alternatively, in a case where no index is extracted because an unregistered new document is scanned, a user inputs character strings of each item as character strings indicating indexes. In this case also, it is determined that an index is input.

In a case where a user inputs an index (YES at S403), document registration processing is performed at S404. In the document registration processing, processing to overwrite information relating to the document type included in the index extraction rule, or new registration processing to register an unregistered document type by registering a new document is performed. The document registration processing will be described later.

In a case where a user does not input an index (NO at S403) or the processing at S404 is completed, the processing advances to S405. At S405, the image processing unit 305 creates a file from the image data obtained at S405 and sets the file name, which is the property determined at S402. In the present embodiment, explanation is given on the assumption that, as an example, a scanned image is saved by using PDF (Portable Document Format) as the file format. In a case of PDF, it is possible to save the scanned image by dividing it into pages and in a case where scanned images of a plurality of document originals are obtained at S400, image data corresponding to each document original is saved in one file as a separate page.

At S406, the scanned image management unit 304 transmits the file created at S405 to a predetermined transmission destination through the LAN 102.

[About Index Extraction Processing (S401)]

Figure 5:
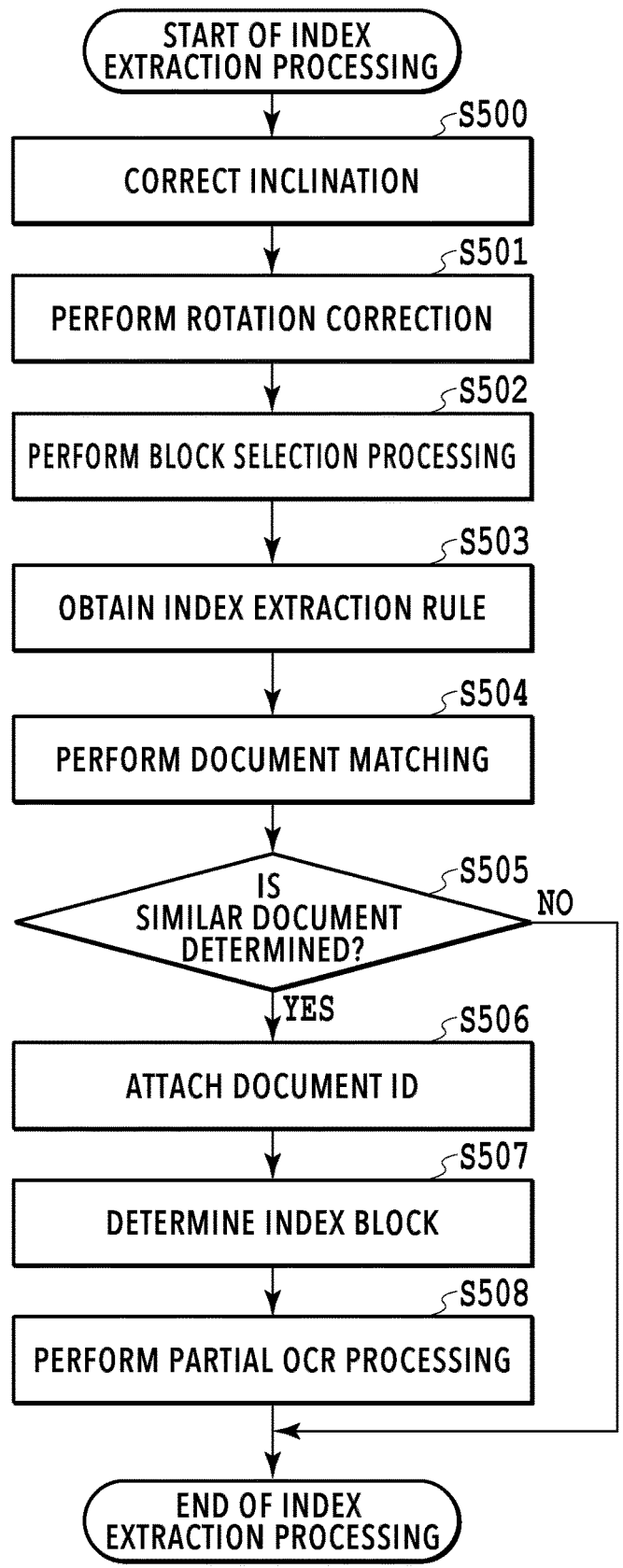
FIG. 5 is a flowchart of index extraction processing.

FIG. 5 is a flowchart showing the index extraction processing at S401. By using FIG. 5, details of the index extraction processing are explained. In the index extraction processing, for one page of the scanned image, the orientation is corrected, the document type is specified, and processing to perform index extraction in accordance with the document type is performed.

At S500, the image processing unit 305 detects the angle of the inclination of the scanned image from the image data and corrects the inclination of the scanned image by rotating the image in the opposite direction by the angle corresponding to the detected inclination. The inclination that is the target of inclination correction occurs by a document original not being read straight at the time of the scan of the document original because of wear or the like of the roller within the document feeder of the scanner unit 123. Alternatively, the inclination occurs by the scanned document original not being printed straight at the time of printing.

As a method of detecting an inclination angle, first, objects included within the image data are detected and the object groups adjacent to one another in the horizontal direction or the vertical direction are linked. Then, the inclination is found by deriving to which extent the line connecting the center positions of the linked object groups is inclined from the horizontal direction or the vertical direction. The method of detecting an inclination angle is not limited to this method. As another method, for example, a method may be accepted in which center coordinates of objects included within the image data are obtained and the center coordinates groups are rotated in units of 0.1 degrees and then, the angle at which the ratio of the center coordinates groups arranged side by side in the horizontal direction or one on top of another in the vertical direction is the highest is taken as the inclination of the scanned image. By correcting the inclination of the scanned image, it is possible to improve the processing accuracy of each of rotation correction, block selection processing, and OCR processing, which are performed later.

At S501, the image processing unit 305 performs image rotation correction in units of 90 degrees for the scanned image after the inclination correction obtained as a result of the processing at S500 so that the character within the image becomes upright. As the method of rotation correction, there is a method in which four images are prepared, that is, a reference image, which is the scanned image after the inclination correction, an image obtained by rotating the reference image by 90 degrees, an image obtained by rotating the reference image by 180 degrees, and an image obtained by the reference image by 270 degrees are prepared, and then, simple OCR processing that can be performed at a high speed is performed for each image and the image in which the number of characters recognized with a degree of reliability higher than or equal to a predetermined value is the largest is taken as the image after the rotation correction. However, the method of rotation correction is not limited to this. The scanned image in the following refers to the scanned image corrected at S500 and S501 unless specified particularly.

At S502, the image processing unit 305 performs block selection processing for the scanned image. The block selection processing is processing to detect text blocks by, after classifying the image into the foreground areas and the background areas, dividing the foreground areas into text blocks and the other blocks.

Specifically, by performing contour tracking for the scanned image binarized into two values, that is, white and black, a pixel block surrounded by a black pixel contour is extracted. Then, for the black pixel block whose area is larger than a predetermined area, the contour tracking is performed also for white pixels located inside thereof and a white pixel block is extracted and further from the inside of a white pixel block whose area is larger than or equal to a predetermined area, a black pixel block is extracted recursively. The black pixel block thus obtained is determined to be the foreground area. The determined foreground areas are classified according to size and shape and classified into areas having different attributes. For example. the foreground area whose aspect ratio is close to 1 and whose size is within a predetermined range is determined to be a pixel block corresponding to a character and further, the area in which characters in close proximity to one another are aligned well and can be grouped is determined to be a character string area (TEXT). The flat pixel block is determined to be a line area (LINE). The range whose size is larger than or equal to a predetermined size and which is occupied by the black pixel block including well-aligned rectangular white pixel blocks is determined to be a table area (TABLE). The area in which irregularly shaped pixel blocks are dispersed is determined to be a photo area (PHOTO). Then, the pixel block whose shape is other than those described above is determined to be a picture area (PICTURE). Then, among the areas divided for each attribute of the object, the foreground area (TEXT) determined to have the character attribute is detected as a text block.

FIG. 6A and FIG. 6B are diagrams showing an example of results of the block selection processing. FIG. 6A shows the scanned image after the rotation correction. FIG. 6B shows results of the block selection processing for the scanned image in FIG. 6A and the rectangle indicated by a dotted line represents the foreground area. In FIG. 6B, the attributes of all the foreground areas are determined, but the attributes are displayed only for part of the foreground areas. Information (information indicating attribute and position and size of each block) on each text block detected at this step is used for OCR processing, degree of similarity calculation and the like, which are subsequent processing.

In the block selection processing at this step, only text blocks are extracted. The reason is that the position of a character string represents the structure of the scanned image well and closely relates to index information. It is not intended to exclude utilization of information on blocks determined to have other attributes, such as a photo area and a table area, in subsequent processing.

At S503, the image processing unit 305 obtains the index extraction rule from the HDD 120 and loads it onto the RAM 119.

Figure 7:
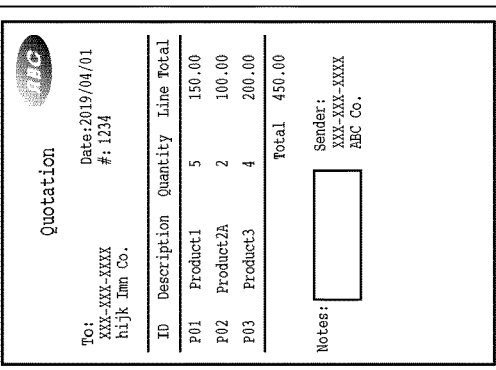
FIG. 7 is a diagram showing an example of an index extraction rule.

FIG. 7 is a diagram showing a part of the index extraction rule (in the following, simply called extraction rule). In the extraction rule, each piece of data of "Document ID", "Registration Name", "Scanned Image", "Document Identification Information", and "Index Information" is associated for each record with each document corresponding to the registered document type. The extraction rule retains these combinations (records) corresponding to the number of registered document types. FIG. 7 shows a record retaining information relating to the document format of the document type to which "0001" is attached as the document ID among the registered document types included in the extraction rule.

In "Document ID", a unique value representing the document type is retained. In "Registration Name", a name representing the document type is retained. In "Scanned Image", the scanned image of the document corresponding to the registered document type is retained. The image that is retained in "Scanned Image" is only required to retain information with which it is possible for a user to understand the contents of the document, and therefore, it may also be possible to retain an image whose resolution is reduced by, for example, about 150 dpi from the original resolution.

In "Document Identification Information", document identification information is retained, which is the position and size of the text block obtained as a result of performing the block selection processing for the scanned image of the document of the document type registered in the record. The document identification information is information for determining the document type of the input document and used in document matching, to be described later. The document identification information is only required to be information necessary for specifying the document type and not limited to information on the position and size of the text block. For example, it may also be possible to retain the position and shape of a ruled line included within the document or utilize a combination of character strings that appear in the document.

In "Index Information", index information for extracting an index is retained. The index is a character string that is used for setting a property of the scanned image as described previously. Specifically, the index information includes information on the coordinates and size of the text block in which the character string (index) of each item is included within the document of the registered document type. An image 701 in "Index Information" in FIG. 7 is displayed for explanation by arranging the position and size of the text block in which each item is included on the coordinates on the image. Further, the index information includes information indicating the index used for generating a file name and its order and information that is attached as metadata.

"File name rule" of the index information indicates that a file name is generated by connecting the indexes of the title (title), the issuer company name (sender), and the business form number (number) in this order with an under score, which is a separator. Further, "Metadata" indicates that the index of the total amount (total_price) is utilized as metadata. That is, by extracting the index of a predetermined item, it is possible to set the file name and metadata to be recommended to a user.

In the present embodiment, although the example is shown in which the extracted index is utilized as a file name or metadata, it may also be possible to retain a rule for determining folder information on a transmission destination of a file, which is another piece of property information. In that case also, the property information generated by using the index is recommended to a user at S402 and the property information modified or confirmed by the user at S405 is set to the file of the scanned image. Further, the extraction-target items are not limited to the title, the issuer company name, the business form number, and the total amount.

The information relating to the document type registered in the extraction rule is set based on the scanned image obtained by scanning the document of the document type. Thus, in the extraction rule, the information relating to the document is registered. Because of this, in the following explanation, there is a case where the document type registered in the extraction rule is described simply as a registered document.

At S504, the image processing unit 305 performs document matching for the scanned image. In the document matching, processing to determine a document corresponding to the scanned image from a document group registered in the extraction rule is performed.

In the document matching, first, the text block of the scanned image and the text block of each registered document are compared in a one-to-one manner and calculation of the degree of similarity representing to what extent the shape and the arrangement of the text blocks are similar is performed. As the method of calculating the degree of similarity, for example, there is a method in which: position adjustment is performed between all the text blocks of the scanned image and all the text blocks of the registered document; then the square (taken as a value A) of the sum total of the areas in which each text block of the scanned image and each text block of the registered document overlap is calculated; further, the product (take as a value B) of the sum total of the areas of the text blocks of the scanned image and the sum total of the areas of the text blocks of the registered documents is calculated; then, the value obtained by dividing the value A by the value B is taken as the degree of similarity. This calculation of the degree of similarity is performed between the scanned image and all the documents registered in the extraction rule.

Then, among the documents registered in the extraction rule, the document whose degree of similarity is higher than or equal to a threshold value TH1 and whose degree of similarity is the highest is determined to be the document (type) in the document format similar to the document format indicated by the scanned image. That is, it is possible to determine a document similar to the document indicated by the scanned image from the documents registered in the extraction rule.

At S505, the image processing unit 305 determines whether a document similar to the document indicated by the scanned image is determined in the extraction rule as a result of the document matching performed S504.

In a case where a document whose degree of similarity with the document format of the scanned image is higher than or equal to the threshold value TH1 does not exist in the documents registered in the extraction rule, it is determined that it is not possible to determine a document similar to the document indicated by the scanned image. In a case where it is not possible to determine a document similar to the document indicated by the scanned image (NO at S505), the processing in this flowchart is terminated. In this case, at S402 that is the next step in the flowchart in FIG. 4, neither file name nor metadata is recommended to a user. Because of this, the display control unit 301 receives an input of an index from a user. Then, at S403, it is determined that input of an index is performed and the processing advances to S404.

In a case where a document similar to the document indicated by the scanned image is determined (YES at S505), the processing advances to S506. That is, in a case where the document in the document format whose degree of similarity with the document format indicated by the scanned image is higher than or equal to the threshold value TH1 is determined in the documents registered in the extraction rule, the processing advances to S506. At S506, the image processing unit 305 attaches the value indicating the document ID associated with the document determined at S504 to the scanned image.

At S507, the image processing unit 305 performs index block determination processing to determine a text block of the extraction-target item within the scanned image based on the extraction rule information associated with the document ID attached at S506. There is a case where a text block in which a character string (index) indicating the item, such as the title, the issuer company name, and the business form number, is included is called an index block.

In order to determine an index block, first, general position adjustment is performed between the text block group of the scanned image obtained at S502 and the text block group of the registered document determined to be similar to the document indicated by the scanned image at S504. Then, the text block within the scanned image whose degree of overlap with the index block of the registered document is the highest is determined to be the index block in the scanned image. The index block determination method is not limited to this method. As another method, for example, it may also be possible to determine an index block within the scanned image by extracting a partial layout including the index block and the text blocks around thereof from the text block group of the document for which similarity is determined. And an index block is determined by searching the local position where the extracted partial layout is fitted to the text block group of the scanned image after the general position adjustment, which is obtained at S502. It is sufficient to perform the searching local position by performing pattern matching by using the partial layout in the search range set in advance.

At S508, the image processing unit 305 performs partial COR processing for the index block group of each item within the scanned image, which is determined at S507, and extracts the character string corresponding to each index block as the index of each item.

[About Confirmation/Modification Processing (S402)]

Figure 8:
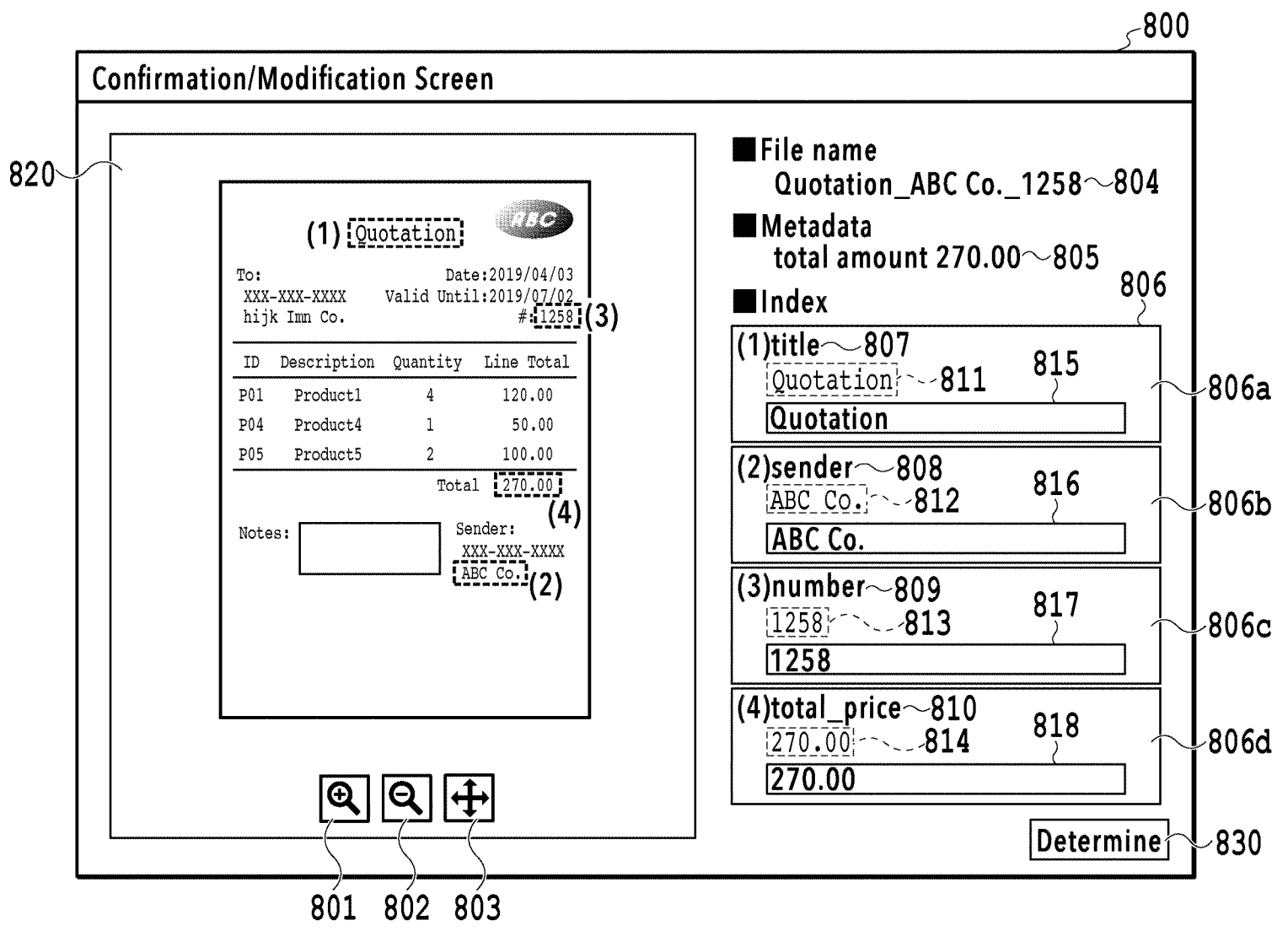

FIG. 8 is a diagram showing an example of Confirmation/Modification Screen 800 that is displayed in the display/operation unit 123. By using FIG. 8, details of the confirmation/modification processing (S402) are explained.

A preview area 820 is an area in which the scanned image obtained at S400 is displayed as a preview image. A rectangle representing the position and size of an index block is displayed highlighted on the scanned image in a superimposing manner. In a case where a document similar to the document indicated by the scanned image is determined at S504, in the preview area 820, the index block determined at S507 is displayed in advance.

A button 801 is a button for giving instructions to increase the display magnification of the preview image and a button 802 is a button for giving instructions to reduce the display magnification. A button 803 is a button for giving instructions to increase or reduce the size of the preview image so that the preview image fits to the width or height of the preview area 820.

Text fields 804 and 805 are areas in which a file name generated in combination with the index and metadata are displayed.

An Index area 806 includes index areas 806a to 806d for each item. In each of the Index areas 806a to 806d, each of index names 807 to 810, each of partial preview areas 811 to 814, and each of text fields 815 to 818 are included. In each of the partial preview areas 811 to 814, each image corresponding to the index block, which is obtained by being partially cut out from the scanned image, is displayed. In each of the text fields 815 to 818, each character string obtained as a result of performing OCR processing for the index block is displayed. In a case where a document similar to the document indicated by the scanned image is determined at S504, each extracted index is displayed in advance in each of the text fields 815 to 818.

For the item for which it is not possible to determine an index block at S507, each item name is displayed in each of the index names 807 to 810, but the partial preview areas 811 to 814 and the text fields 815 to 818 are displayed in the empty state. In a case where it is not possible to determine a document similar to the document indicated by the scanned image at S504, processing is performed on the assumption that it is not possible to determine the index blocks of all the items, such as the title, the issuer company name, the business form number, and the total amount. Because of this, all the partial preview areas 811 to 814 and the text fields 815 to 818 are displayed in the empty state.

An index block modification (index modification) procedure in a case where the position of an index block is determined erroneously or in a case where it is not possible to determine an index block is explained. Explanation is given by taking a case as an example where the index block of the item of the business form number (number) is modified. First, a user selects the index area 806c of "(3) number", which is the modification-target item. For example, the index area 806c is selected by clicking some position within the index area 806c. Following this, the user selects the text block in which the character string of the modification-target item is included on the preview image in the preview area 820 by a click or the like. In accordance with the selected text block, in the partial preview area 813, a partial image of the selected text block is displayed and in the text field 817, the character string obtained from the selected text block by performing OCR processing is displayed. In this manner, the position of the selected text block is modified as the position of the index block of the item. The position information on the modified index block is used for updating the index information on the overwriting-target document in overwriting, to be described later. Alternatively, the position information on the modified index block is used for registering index information on a new document in new registration.

In a case of completing the modification of the index block and completing the confirmation of the index currently being displayed, the user presses down a Determine button 830. In a case where the pressing down of the Determine button 830 is received, the index, the file name, and the metadata are settled and the processing is advanced to S403.

[About Document Registration Processing (S404)]

Figure 9:
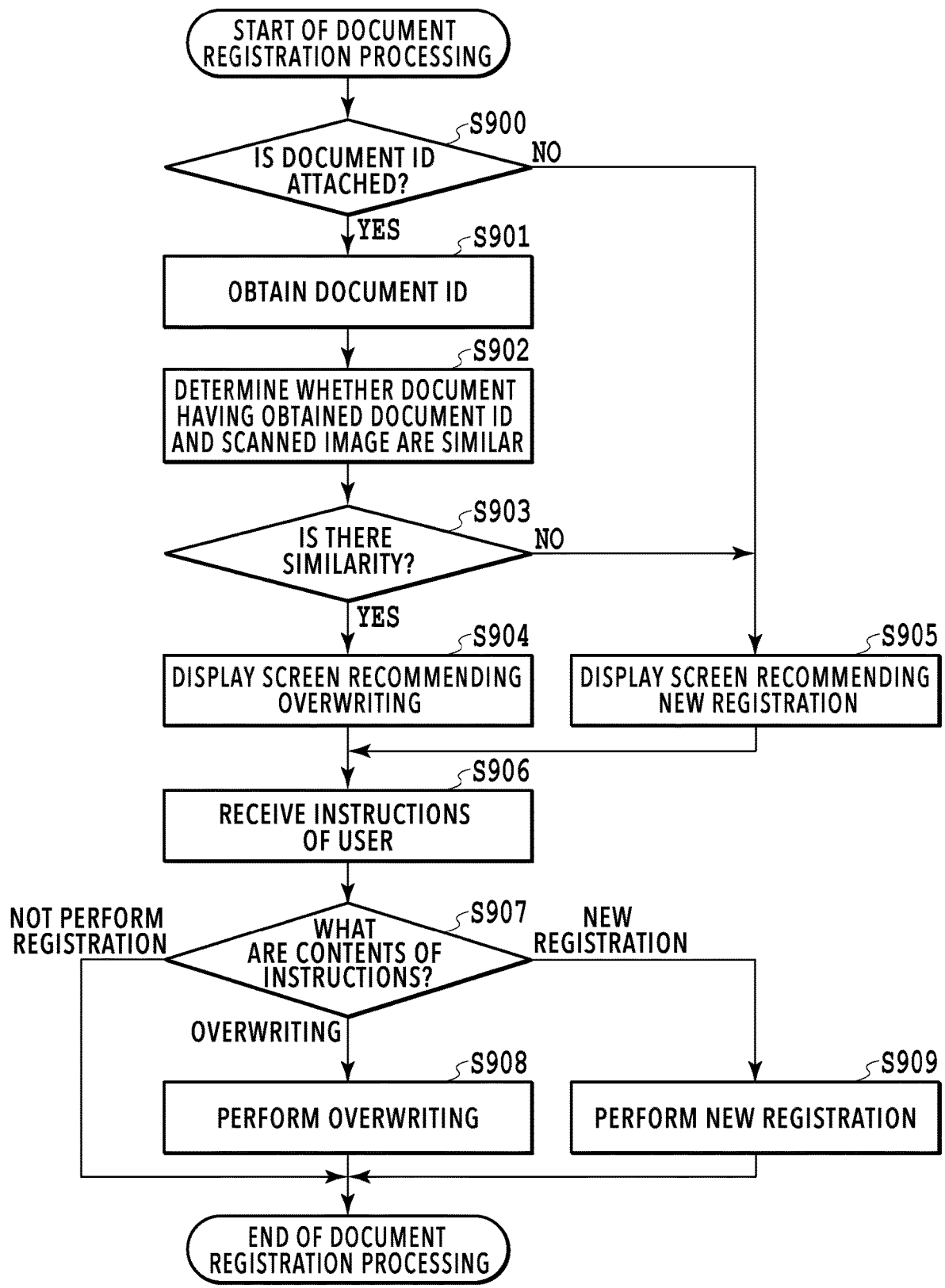
FIG. 9 is a flowchart of document registration processing.

FIG. 9 is a flowchart showing the document registration processing at S404. Details of the document registration processing are explained by using FIG. 9. In the document registration processing, processing (overwriting) to update the information relating to the document registered in the extraction rule and processing (new registration) to register new information to the extraction rule are performed.

At S900, the image processing unit 305 determines whether a document ID is attached to the scanned image at S506. In a case where it is possible to determine a document similar to the document indicated by the scanned image from the extraction rule in the document matching at S504 in FIG. 5, a document ID is attached to the scanned image. Consequently, at this step, whether a document similar to the document indicated by the scanned image is determined in the document matching at S504 in the index extraction processing is determined.

In a case where a document ID is attached to the scanned image (YES at S900), the processing advances to S901. At S901, the image processing unit 305 obtains the document ID that is attached at S506 in FIG. 5.

At S902, the image processing unit 305 determines whether the document associated with the document ID that is attached at S506 among the documents registered in the extraction rules and the document indicated by the scanned image are similar. At S902, similarity is determined by a method whose accuracy is higher than that of the method used in the document matching at S504. The document associated with the document ID that is attached at S506 is the registered document similar to the document indicated by the scanned image, which is determined at S504 in the index extraction processing.

At S902 of the present embodiment, first, the image processing unit 305 obtains the degree of similarity between the document indicated by the scanned image and the document determined to be similar to the document indicated by the scanned image at S504. It may also be possible to calculate the degree of similarity by the same method as that used in the document matching at S504 and it may also be possible to obtain the value calculated in the document matching at S504.

Then, at S902 of the present embodiment, the image processing unit 305 uses a threshold value TH2 different from the threshold value TH1 used in the document matching at S505. In a case where the degree of similarity between the document indicated by the scanned image and the document determined at S504 is higher than the threshold value TH2, the image processing unit 305 determines that the document indicated by the scanned image is similar to the document corresponding to the scanned image, which is determined at S504.

Figures 10A, 10B, 10C, 10D:
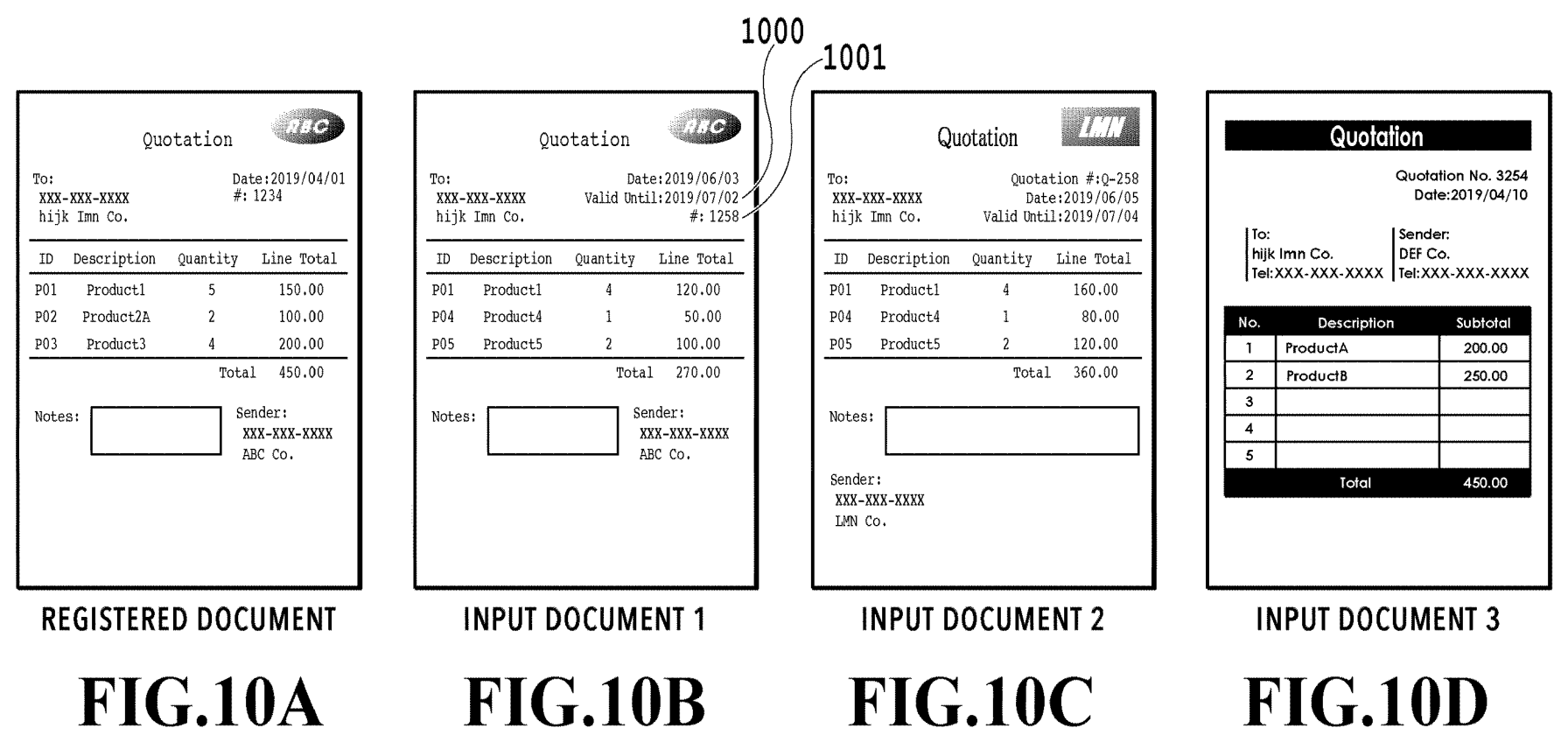

FIG. 10A to FIG. 10D are diagrams showing examples of a document registered in the extraction rule and input documents that are taken as the target of scan. A document in FIG. 10A represents a document of the document type registered in the extraction rule whose document ID shown in FIG. 7 is "0001".

An input document 1 in FIG. 10B is an example of an input document whose issuer company is the same as that of the document in FIG. 10A and whose type is the same, but whose part of the layout is changed.

An input document 2 in FIG. 10C is an example of a document whose document layout is similar to the that of the document in FIG. 10A, but which is issued from another company and whose type is different from that of the document in FIG. 10A.

An input document 3 in FIG. 10D is an example of a document that is issued from a company different from the issuer company of the document in FIG. 10A and whose layout is different therefrom, and therefore, whose document type is different.

Figure 11A:
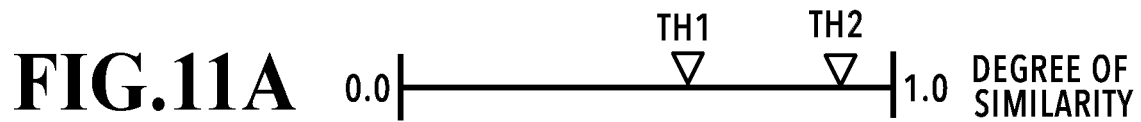
FIG. 11A and FIG. 11B are diagrams explaining threshold values that are used for similarity determination.
Figure 11B:
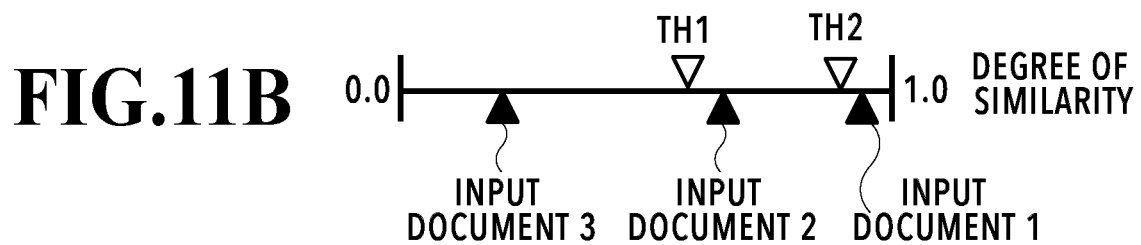

FIG. 11A and FIG. 11B are diagrams for explaining the threshold value TH2 that is used at S902 of the present embodiment. FIG. 11A shows a relationship between the threshold value TH1 that is used in the document matching at S504 and the threshold value TH2 that is used at S902. In the document matching at S504, in a case where a document corresponding to the scanned image is not determined, it is not possible to make a transition into S506 to S508 to perform processing to extract an index. Because of this, in order to increase the frequency at which a transition is made to S506 to S508, the threshold value TH1 is set so that it is possible to determine the document type of the input document by allowing a difference to a certain extent between the document indicated by the scanned image and the registered image.

On the other hand, the threshold value TH2 that is used for the determination at S902 is a threshold value for determining whether the document determined to correspond to the scanned image at S504 is really the document whose type is the same as that of the input document. Because of this, the threshold value TH2 is set in advance to a value higher than the threshold value TH1.

FIG. 11B is a diagram showing the degree of similarity of the document format of each of the input document 1, the input document 2, and the input document 3 with the document format of the registered document in FIG. 10A. The processing at S902 is explained by using FIG. 10A to FIG. 10D and FIG. 11A and FIG. 11B.

The degree of similarity of the input document 1 is higher than the threshold value TH1 and the threshold value TH2. Because of this, in the document matching at S504 in FIG. 5, it is determined that the document indicated by the scanned image of the input document 1 and the document in FIG. 10A are similar. Because of this, at S900, it is determined that the document ID is attached at S900 and the processing advances to S902. At S902, it is determined that the degree of similarity is higher than the threshold value TH2, and therefore, at S902 also, it is determined that the document indicated by the scanned image of the input document 1 is similar to the document in FIG. 10A. Because of this, it is possible to determine that the input document 1 is the document whose type is the same as that of the document in FIG. 10A, which is used in the index extraction processing.

The degree of similarity of the input document 2 is higher than the threshold value TH1 but lower than the threshold value TH2. Because of this, in the document matching at S504 in FIG. 5, it is determined that the document indicated by the scanned image of the input document 2 and the document in FIG. 10A are similar. Because of this, it is determined that the document ID is attached at S900 and the processing advances to S902. However, at S902, it is determined that the degree of similarity is lower than the threshold value TH2, and therefore, it is determined that the document indicated by the scanned image of the input document 2 is not similar to the document in FIG. 10A. The input document 2 is an example of the document for which similarity is determined in the document matching at S504 because the type thereof is different from that of the document in FIG. 10A but the layout is similar.

The degree of similarity of the input document 3 is smaller than the threshold value TH2 and the threshold value TH1. Because of this, in the document matching at S504 in FIG. 5, it is not determined that the input document 3 is similar to the document in FIG. 10A. Because of this, it is not determined that the document ID is attached at S900, and therefore, the processing does not transition to S902.

Next S903 is a step for switching processing to another in accordance with the processing results at S902. In a case where it is determined that the document indicated by the scanned image is similar to the document determined at S504 (YES at S903), the processing is advanced to S904.

At S904, the display control unit 301 performs processing to recommend overwriting of the information relating to the document registered in the extraction rule to a user.

For example, in the input document 1 in FIG. 10B, a text block 1000 relating to the term of validity, which does not exist in the registered document in FIG. 10A, is inserted and the position of an index block 1001 of the business form number is shifted downward. As described above, even the scanned image of the document whose type is the same as that of the registered document, on a condition that the position of the registered index is partially different, there is a case where extraction of the index fails. In this case, modification of the index block is performed based on instructions of a user in the confirmation/modification processing. Further, it is possible for a user to update the registered document in FIG. 10A based on the scanned image of the input document 1 by giving instructions to perform overwriting of the information on the registered document. Because of this, by performing overwriting, in a case where a document similar to the input document 1 is scanned next time, it is possible to suppress a failure in extraction of an index.

On the other hand, in a case where it is not possible to determine a document similar to the document indicated by the scanned image at S504 in FIG. 5 from the extraction rule, it is determined that no document ID is attached at S900. In a case where no document ID is attached (NO at S900), the processing advances to S905. Further, also in a case where it is determined that the document indicated by the scanned image is not similar to the document determined at S504 in the processing at S902 (NO at S903), the processing is advanced to S905.

At S905, the display control unit 301 performs processing to recommend new registration to a user based on the scanned image. For example, as in the case of the input document 2 in FIG. 10C, there is a case where it is determined that a similar document exists in the document matching at S504 because the type of the document is not registered but the layout of the document is similar to that of the document whose type is registered. The document type of the input document 2 is a document type that is not registered, and therefore, it is desirable to newly register the document type of the input document 2. Because of this, even in a case where similarity is determined in the document matching at S504, by performing the document matching again at S902, it is possible to recommend new registration in a case where the input document is a document whose type is not registered.

As described above, in the present embodiment, whether the document used to extract the index and the document indicated by the scanned image are similar is determined again by a different method with an accuracy higher than that of the method at the time of the index extraction processing. Because of this, it is possible to appropriately switch between recommending overwriting of the information on the registered document and recommending new registration.

Figure 12A:
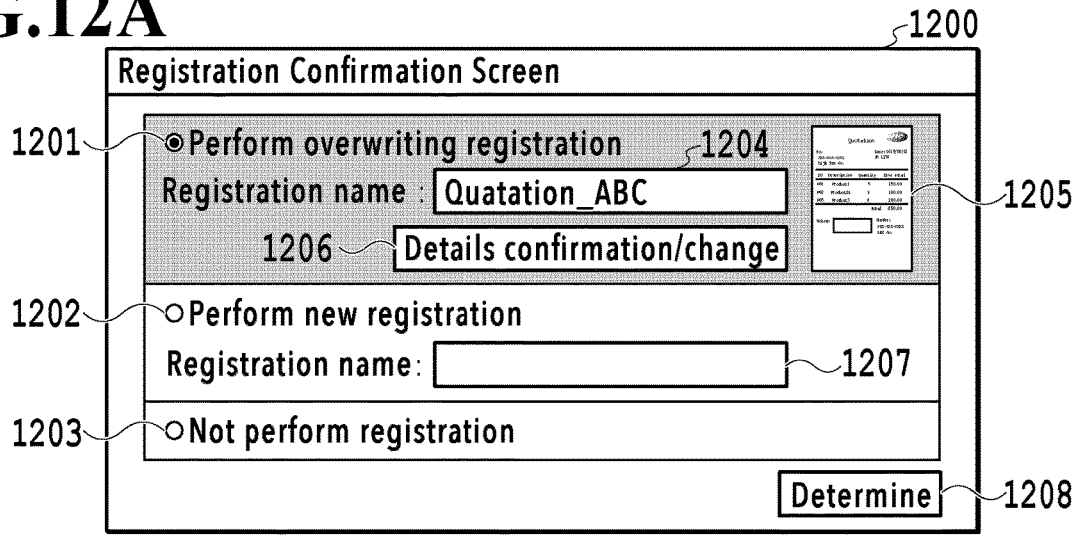
FIG. 12A to FIG. 12C are each a diagram showing an example of a registration confirmation screen.
Figure 12B:
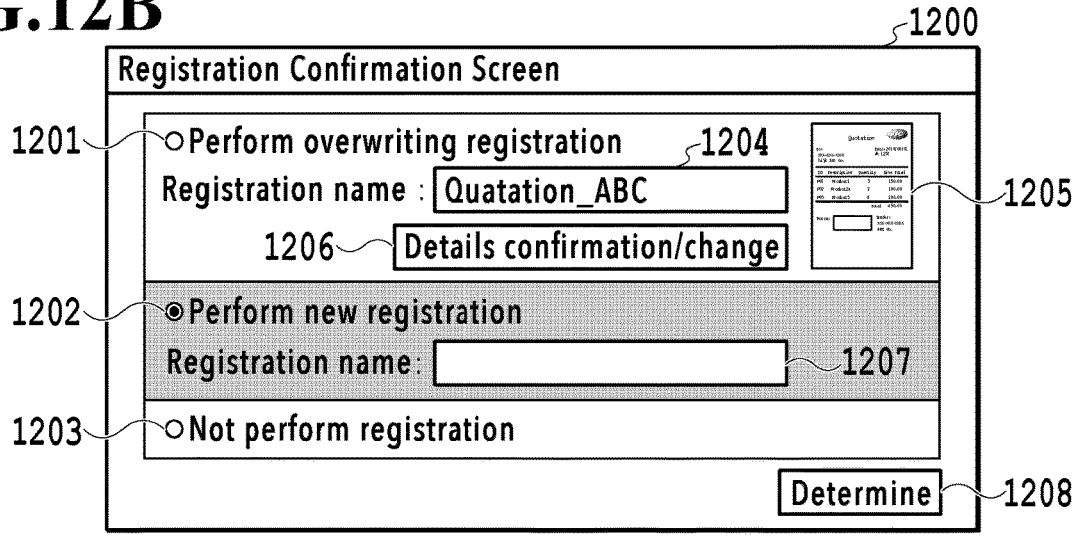
Figure 12C:
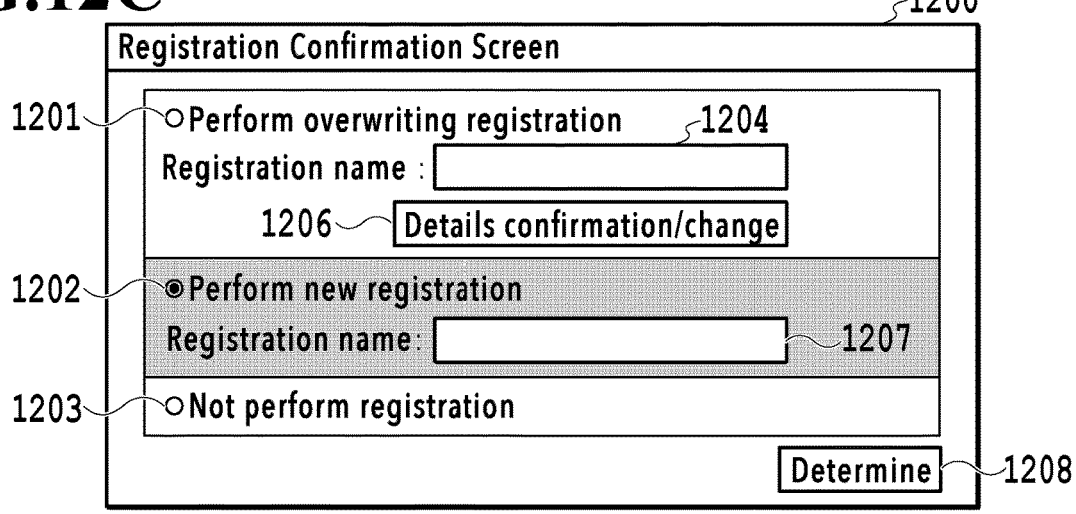

FIG. 12A to FIG. 12C are each a diagram showing an example of Registration Confirmation Screen 1200, which is a screen for a user to give instructions to perform overwriting or new registration. By using FIG. 12A, Registration Confirmation Screen 1200 is explained.

Radio buttons 1201 to 1203 are provided in correspondence to "Perform overwriting registration", "Perform new registration", and "Not perform registration" respectively and setting is performed so that the state is brought about where one of the radio buttons 1201 to 1203 is selected. A text field 1204 is an area in which the registration name of a document targeted to perform the overwriting (an overwriting-target document) registered in the extraction rule is displayed. A thumbnail area 1205 is an area in which the scanned image of an overwriting-target document is displayed as a thumbnail.

A Details confirmation/change button 1206 is a button for making a transition into Document Registration Screen 1300 (see FIG. 13), which is a screen for checking details of an overwriting-target document and changing an overwriting-target document to another document. A text field 1207 is an area for receiving a document name at the time of performing new registration from a user.

A Determine button 1208 is a button for a user to give instructions to perform processing in accordance with the selected one of the radio buttons 1201 to 1203. By pressing down the Determine button 1208 in the state where the radio button 1201 of "Perform overwrite registration" is selected, it is possible for a user to give instructions to perform overwriting of the information on the registered document. Similarly, by selecting the radio button 1202 of "Perform new registration" or the radio button 1203 of "Not perform registration" and then pressing down the Determine button 1208, it is possible for a user to give instructions for the processing to perform new registration or not to perform registration.

FIG. 12A is an example of Registration Confirmation Screen 1200 for recommending overwriting of the information on the registered document to a user. That is, FIG. 12A is an example of Registration Confirmation Screen 1200 that the display control unit 301 displays at S904. For example, in a case where the input document 1 in FIG. 10B is scanned and an index extracted from the scanned image is modified by a user, in the document registration processing, the processing makes a transition into S904 and Registration Confirmation Screen 1200 in FIG. 12A is displayed. At S904, overwriting the information on the registered document is recommended, and therefore, Registration Confirmation Screen 1200 is displayed in the state where the radio button 1201 for a user to give instructions to perform overwriting of the information on the registered document is selected.

In a case where overwriting of the information on the registered document is recommended at S904, as the overwriting-target document, the document for which similarity is determined in the document matching at S504 in FIG. 5 is recommended. For example, FIG. 12A is an example in which the registered document in FIG. 7 is recommended as the overwriting-target document. Because of this, in the text field 1204 of the registration name on Registration Confirmation Screen 1200 in FIG. 12A, "Quotation_ABC" is displayed and in the thumbnail, the scanned image in FIG. 7 is displayed. Because of this, in a case where a user gives instructions to perform the overwriting, it is made possible to select the document whose degree of similarity with the document indicated by the scanned image in the document matching at S504 in FIG. 5 is the highest as the overwriting-target document as it is.

FIG. 12B is an example of Registration Confirmation Screen 1200 for recommending new registration. That is, FIG. 12B is an example of Registration Confirmation Screen 1200 that the display control unit 301 displays at S905. For example, in a case where the input document 2 in FIG. 10C is scanned and an index extracted from the scanned image is modified by a user, in the document registration processing, the processing makes a transition into S905 and Registration Confirmation Screen 1200 in FIG. 12B is displayed. At S905, new registration is recommended, and therefore, Registration Confirmation Screen 1200 is displayed in the state where the radio button 1202 for giving instructions to perform new registration is selected.

In the text field 1204 and the thumbnail area 1205 in FIG. 12B as well, the registration name and the thumbnail of the document for which similarity is determined in the document matching at S504 are displayed. That is, even in a case where a user gives instruction to perform overwriting, not new registration, it is made possible to select the document whose degree of similarity with the document indicated by the scanned image is the highest in the document matching at S504 in FIG. 5 as the overwriting-target document.

FIG. 12C is an example of Registration Confirmation Screen 1200 for recommending new registration, which the display control unit 301 displays in a case where the processing advances to S905 after it is determined that no document ID is attached at S900. For example, FIG. 12C is Registration Confirmation Screen 1200 in a case where the input document 3 in FIG. 10D is scanned. As in FIG. 12B, Registration Confirmation Screen 1200 is displayed in the state where the radio button 1202 for giving instructions to perform new registration is selected. However, different from FIG. 12B, no similar document is determined in the document matching at S504 in FIG. 5, and therefore, information on the overwriting-target document is not displayed in the text field 1204 and the thumbnail area 1205. In a case of giving instructions to perform overwriting, a user presses down the Details confirmation/change button 1206 and selects the overwriting-target document on Document Registration Screen 1300 (see FIG. 13 or FIG. 14).

As above, in the present embodiment, the operation is switched between recommending the document for which similarity is determined in the index extraction processing as the overwriting-target document and not recommending the overwriting-target document. Because of this, in a case of giving instructions to perform overwriting, it is possible for a user to reduce the time and effort to select a document.

Figure 13:
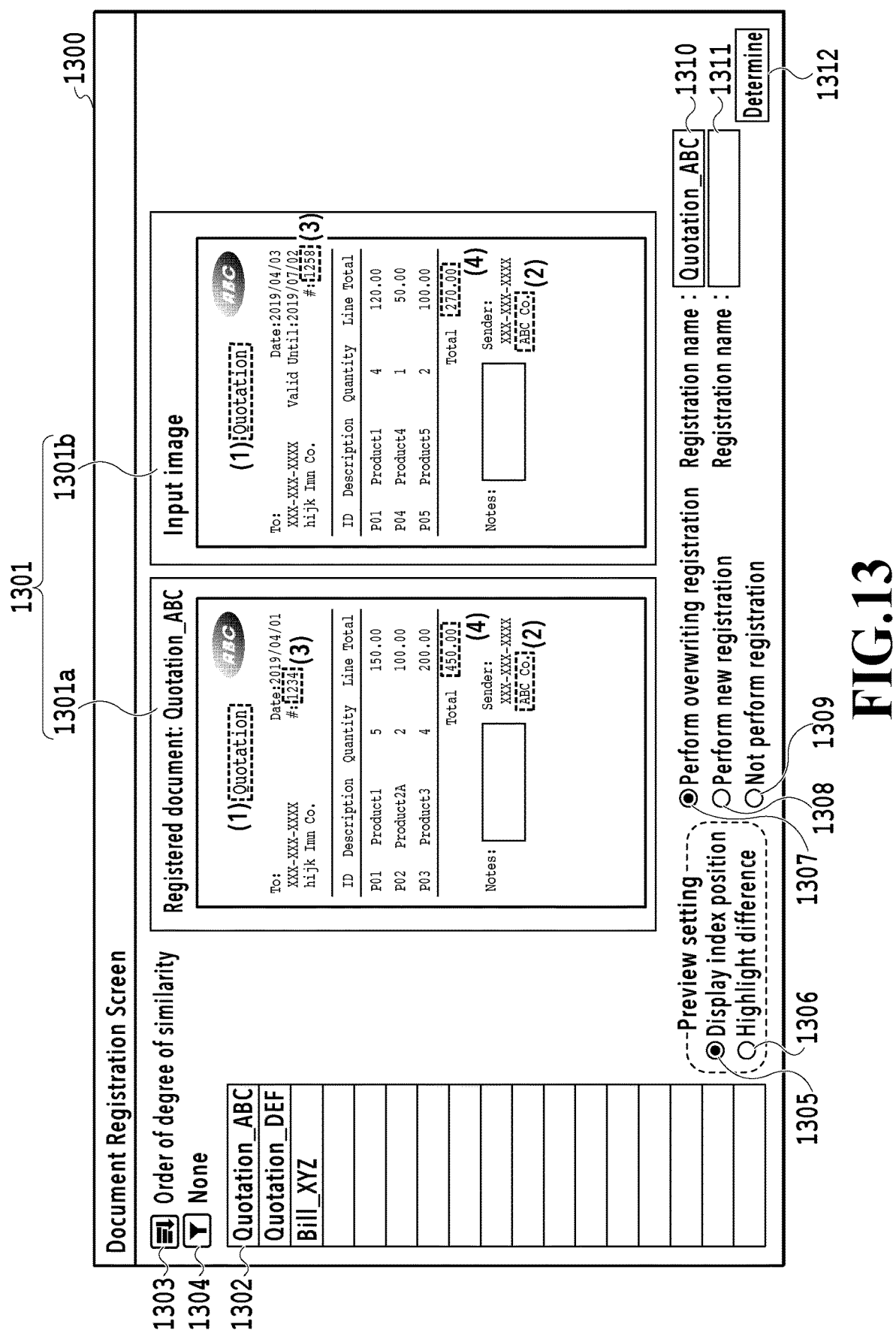
FIG. 13 is a diagram showing an example of a document registration screen.

FIG. 13 and FIG. 14 are each a diagram showing an example of Document Registration Screen 1300. Document Registration Screen 1300 is a screen that is displayed in a case where the Details confirmation/change button 1206 is pressed down on Registration Confirmation Screen 1200. By using FIG. 13, Document Registration Screen 1300 is explained.

A preview area 1301 includes a preview area 1301a in which the image of an overwriting-target registered document is displayed and a preview area 1301b in which the scanned image of an input document is displayed. Because of this, it is possible for a user to compare the input document and the overwriting-target document by visual inspection.

In a list 1302, a list of registration names of documents registered in the extraction rule is displayed. It is possible for a user to change the overwriting-target document by selecting a document from the list 1302. Further, the image of the document selected from the list 1302 is displayed in the preview area 1301a.

A sort instruction button 1303 is a button for giving instructions to perform sorting of the registration names of the documents displayed in the list 1302 and for example, it is possible to give instructions to perform sorting in ascending order or descending order of the degree of similarity, the date of registration, and the date of utilization.

A filter instruction button 1304 is a button for giving instructions to narrow the documents that are displayed in the list 1302. For example, it is possible to display only the documents whose degree of similarity with the document indicated by the scanned image is higher than or equal to a predetermined value in the list 1302, or perform filtering to select documents by the registration name and display only them in the list 1302. Due to these buttons, for example, it is possible for a user to give instructions to display the documents in descending order of the degree of similarity by sorting instructions and further to display the documents whose degree of similarity with the document indicated by the scanned image is higher than or equal to a predetermined value by filtering instructions. Because of this, it is possible for a user to select a comparison-target document that is displayed in the preview area 1301a from among the documents whose degree of similarity is higher than or equal to the predetermined value, and therefore, it is possible to reduce the time and effort to select an overwriting-target document. Further, it may also be possible to display Document Registration Screen 1300 in the state where the sorting instructions and the filtering instructions are applied as a default.

As above, in the present embodiment, at the time of a user selecting an overwriting-target document, it is possible to switch display orders based on the degree of similarity between the document registered in the extraction rule and the document indicated by the scanned document. Further, it is possible to display a list of documents that a user can select by narrowing the documents that are displayed. Because of this, it is made possible for a user to easily select an overwriting-target document.

Radio buttons 1305 and 1306 are buttons for selecting information that is superimposed on the image of the document being displayed in the preview area 1301. In a case where the radio button 1305 is selected, it is possible to highlight the index block position as indicated by a dotted-line rectangle within the preview area 1301 in FIG. 13. Further, in a case where the radio button 1306 is selected, as shown in the preview area 131b on Document Registration Screen 1300 in FIG. 14, areas 1400 and 1401 for which there is a difference between the comparison-target document and the input document are highlighted. In the determination method of an area for which there a difference: first, the general position adjustment is performed based on the text block groups of the comparison-target document and the input document and the block whose degree of overlap is high among the text block groups is determined to be a corresponding block; the text block for which the corresponding block is not found is determined to be an area for which there a difference; alternatively, by comparing the corresponding blocks of the comparison-target document and the input document, the text block whose difference in size is large in the comparison results is determined to be an area for which there a difference. The determination method of an area for which there a difference is not limited to this method. As another method, for example, it may also be possible to perform the general position adjustment for each scanned image of the comparison-target document and the input document and derive a difference in the average luminance value for each text block and determine the text block whose difference is larger than or equal to a predetermined value to be an area for which there is a difference.

As above, in the present embodiment, the difference in the index block position and the difference in the document in the scanned image are displayed. Because of this, it is possible to display the screen for comparing the document selected as the overwriting target and the document indicated by the scanned document, and therefore, it is possible for user to reduce the time and effort at the time of determining which of the processing to perform overwriting, the processing to perform new registration, and the processing not to perform registration the instructions are given to.

Returning to FIG. 13 and explanation of Document Registration Screen 300 is continued. Radio buttons 1307 to 1309 and text fields 1310 and 1311 have the same functions as those of the radio button 1201 to 1203 and the text fields 1204 and 1207 on Registration Confirmation Screen 1200 in FIG. 12. In the text field 1310, the registration name of the document currently being selected from the list 1302 is displayed. In a case where a Determine button 1312 is pressed down, instructions to perform the processing selected by one of the radio buttons 1307 to 1309 are given. That is, on Document Registration Screen 1300, after comparing the image of the document registered in the extraction rule and the scanned image of the input document and comparing the index block positions, it is possible for a user to give instructions to perform one of the processing to perform overwriting, the processing to perform new registration, and the processing not to perform registration.

Returning to FIG. 9, explanation of the document registration processing is continued. At S906, the image processing unit 305 receives instructions of a user via Registration Confirmation Screen 1200 or Document Registration Screen 1300. For example, after recommendation is performed at S904 or S905, in a case where the Determine button 1208 on Registration Confirmation Screen 1200 or the Determine button 1312 on Document Registration Screen 1300 is pressed down, instructions are received at this step.

At S907, the image processing unit 305 switches processing based on the instructions received at S906. In a case where instructions not to perform registration (nor overwriting) are received, the document registration processing is terminated. In a case where instructions to perform the overwriting are received, the processing is advanced to S908.

At S908, in a case where the Determine button 1208 on Registration Confirmation Screen 1200 is pressed down, the image processing unit 305 performs the overwriting processing by taking the document of the registration name displayed in the text field 1204 as the overwriting-target document. Alternatively, in a case where the Determine button 1312 on Document Registration Screen 1300 is pressed down, the image processing unit 305 performs the overwriting processing by taking the document selected from the list 1302 as the overwriting-target document. In the overwriting method, for example, among the information retained in the extraction rule associated with the document ID of the overwriting-target document, "Scanned Image" is updated by the image based on the scanned image obtained at S400. "Document Identification Information" is updated by the information on the text block detected at S502. Further, "Index Information" is updated based on the position of the index block that is input at S402.

In a case where it is determined that new registration is performed at S907, the processing is advanced to S909. At S909, the image processing unit 305 generates a new unique value as the document ID. Then, in "Scanned Image" the image based on the scanned image obtained at S400 is set. In "Document Identification Information", the information on the text block detected at S502 is set. Further, in "Index Information", the information on the position of the index block that is input at S402 is set. The set information is registered anew in the extraction rule in association with the generated document ID.

As explained above, in the present embodiment, in a case where modification of an index is performed by a user, control is performed to display a screen for receiving instructions to perform one of the processing to perform overwriting, the processing to perform new registration, and the processing not to perform registration. Because of this, according to the present embodiment, in a case where a document whose type is not registered is scanned, or in a case where a document is scanned, whose type is the same as the document type registered by the issuer, but which is changed partially, it is possible to reduce the time and effort to give instructions to perform overwriting or new registration.

Further, only presenting simple alternatives of whether to perform overwriting or new registration as another document, there is a case where it is not possible for a user to determine which to select. In the present embodiment, the processing to determine whether the document used for the index extraction processing is the document whose type is the same as that of the document indicated by the scanned image is performed and based on the results, the operation is switched between recommending overwriting and recommending new registration. Because of this, according to the present embodiment, it is possible for a user to easily determine which of overwriting and new registration instructions are given to.

As above, according to the present embodiment, by presenting which of overwriting and new registration should be performed to a user in an easy-to-see manner, it is possible to appropriately perform updating of the information registered in the extraction rule. Because of this, it is possible to appropriately set a property of a scanned image.

The threshold value TH1 and the threshold value TH2 may be fixed values common to the document indicated the scanned image, which is the target of calculation of the degree of similarity, or the document group registered in the extraction rule. Alternatively, it may also be possible to change the values of the threshold value TH1 and the threshold value TH2 in accordance with the document indicated by the scanned image or the registered document. The change may be performed in operation. For example, it is assumed that there is a case where instructions to perform new registration are given by a user a predetermined number of times despite that the degree of similarity between the document indicated by the scanned image and a certain registered document is higher than the threshold value TH1. In this case, it may also be possible to increase the value of the threshold value TH1 for the determination of similarity with the registered document. By changing the threshold value TH1 in accordance with a document as described above, it is possible to reduce the frequency of recommending an index erroneously.

Further, in a case where instructions to perform new registration are given by a user despite that the degree of similarity between the document indicated by the scanned image and a certain registered document is higher than the threshold value TH2, it may also be possible to increase the threshold value TH2 for the determination of similarity with the registered document, similarly.

Further, in a case where modification is not performed by a user in the confirmation/modification processing at S402, the document determined in the document matching at S504 is the document whose type is the same as that of the input document. Because of this, it may also be possible to update the threshold value TH2 based on the average value or the variance of the degree of similarity in a case where no index is input by a user at S402.

Second Embodiment

In the first embodiment, the method is explained in which whether the document determined in the index extraction processing and the document indicated by the scanned image are similar is determined by using the threshold value TH2 different from the threshold value TH1 used in the document matching in the index extraction processing. However, on a condition that it is not possible to appropriately set the threshold value TH2, there is a case where erroneous determination is performed. Consequently, in the present embodiment, a method of determining whether the document determined in the index extraction processing and the document indicated by the scanned image are similar based on the character string type is explained. The present embodiment is explained by focusing attention on differences from the first embodiment. The portions that are not described explicitly are the same configuration and processing as those of the first embodiment.

Figure 15:
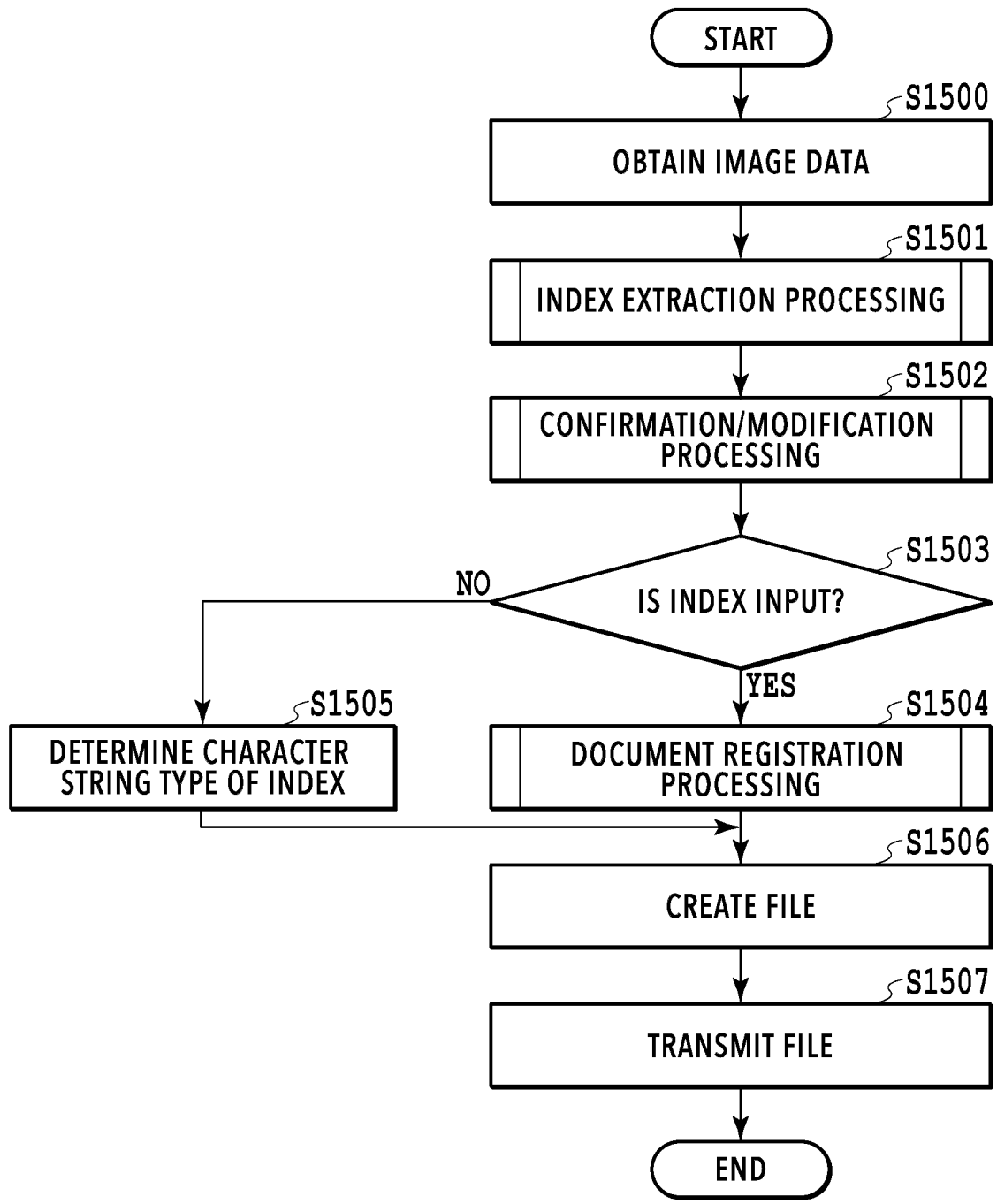
FIG. 15 is a flowchart of file generation processing of a scanned image.

FIG. 15 is a flowchart of file generation processing of a scanned image in the present embodiment. The contents of the processing are explained by focusing attention on differences from the file generation processing (FIG. 4) of a scanned image of the first embodiment. S1500 to S1502 are the same as S400 to S402, and therefore, explanation is omitted. Further, S1504 is the same as S404 and S1506 to S1507 are the same as S405 to S406, and therefore, explanation is omitted.

In a case where it is determined that a user does not input an index at S1503 (NO at S1503), it is indicated that the extraction of an index is performed appropriately. In this case, the processing advances to S1505 and at S1505, the image processing unit 305 performs processing to determine the character string type of the index in the document registered in the extraction rule. Specifically, the image processing unit 305 performs processing for determining the character string type representing the feature of the character string of the index of each item of the document registered in the extraction rule based on the index extracted from the scanned image obtained at S1500.

FIG. 16 is a diagram for explaining the determination method of the character string type of the index of a certain document among the documents registered in the extraction rule. A table 1600 is a table for determining the character string type of each index of the document whose Document ID shown in FIG. 7 is "0001". In this manner, a table corresponding to each document registered in the extraction rule is stored. In a row group 1601 in the table 1600, the character string indicating the index of each item extracted so far from the scanned image that is determined to be similar to the document in FIG. 7 in the index extraction processing is retained.

Details of the processing at S1505 are explained. The image processing unit 305 obtains the table 1600 corresponding to the document determined to be similar to the document indicated by the scanned image in the document matching in the index extraction processing. Then, the image processing unit 305 adds a row to the row group 1601 in the table 1600 and transcribes the character string indicating the index extracted in the index extraction processing into the column corresponding to each item. In a case where the number of rows included in the row group 1601 exceeds a predetermined number, that is, the number of scanned images whose index is transcribed exceeds a predetermined number, the image processing unit 305 determines the character string type for each item.

A row 1602 is a row for retaining the character string type determined for each item. A row 1603 is a row for retaining details of the character string type retained in the row 1602. As the kinds of character string type, for example, there are fixed character string type, numerical value type, and estimation type. The character string type that is determined is not limited to the fixed character string type, the numerical value type, and the estimation type described above.

The fixed character string type is a character string type in a case where the character string indicating the index is fixed in the scanned image whose document format is determined to be similar to that of a certain document in the index extraction processing. In the table 1600, as shown in the row 1602, the items of the title (title) and the issuer company name (sender) are determined to be the fixed character string type. The reason is that all the character strings retained in the column of "title" in the row group 1601 are "Quotation" and another character string does not exit, that is, the character string is fixed, and therefore, the character string is determined to be the fixed character string type. Consequently, as shown by the character string in the column of "title" in the row 1603, the character string that is extracted as the index of the title (title) is determined to be "Quotation" for all the scanned images and "Quotation" is retained. Similarly, in a case of the issuer company name (sender), in the row 1603, the character string of "ABC Co." is retained.

The estimation type is different from the fixed character string type and is a character string type in a case where a character string in accordance with a specific pattern is extracted as an index. In the table 1600, as shown in the row 1602, the item of the business form number (number) is determined to be the estimation type. The reason is that although all the character strings retained in the column of "number" in the row group 1601 are different, all of them consist of a four-digit numeric string, and therefore, the character string is determined to be the estimation type. Further, as shown in the row 1603, as details of the character string type of "number", "####" indicating that the character string consists of a four-digit numeric string is retained.

The numerical value type is different from the fixed character string type or the estimation type and is a character string type in a case where the character string indicating an index is extracted as a character string consisting of only figures, commas, and dots and whose length is variable. In the table 1600, as shown in the row 1602, the item of the total amount (total_price) is determined to be the numerical value type. The reason is that although all the character strings retained in the column of "total_price" in the row group 1601 are different, all of them consist of only figures, commas, and dots.

At S902 of the present embodiment, whether the document indicated by the scanned image is similar to the document for which similarity is determined in the index extraction processing is determined by using the character string type of each item determined at S1505.

FIG. 17 is a diagram for explaining the determination processing at S902 of the present embodiment. In the table in FIG. 17, a row 1701 in which the character string type is retained and a row 1702 in which details are retained are the same as the row 1602 and the row 1603, respectively, in FIG. 16. That is, the character string type is that determined as a result of performing the file generation processing in FIG. 15 for a plurality of scanned images obtained by the scan performed in the past and that of each item of the document whose Document ID shown in FIG. 7 is "0001".

In a row 1703 in the table in FIG. 17, the character string indicating the index of each item, which is extracted from the scanned image of the input document 1 in FIG. 10B, is retained. It is assumed that the document indicated by the scanned image of the input document 1 is determined to be similar to the document whose Document ID shown in FIG. 7 is "0001". Because of this, at S902, determination of similarity with the document whose Document ID is "0001" is performed based on the character string type.

In FIG. 17, for the title (title) and the issuer company name (sender), which are the items of the fixed character string type, the character string retained in details in the row 1702 and the extracted character string retained in the row 1703 match with each other. Further, for the item of the business form number, which is the item of the estimation type, the extracted character string retained in the row 1703 matches with details in the row 1702 because of consisting of the four-digit numeric string. Furthermore, for the total amount (total_price), which is the item of the numerical value type, because the extracted character string retained in the row 1703 consists of only figures, commas, and dots, the character string type matches. Because of the above, it is determined that in all the items, the character string type of the index extracted from the scanned image and the character string type of the scanned image for which similarity is determined in the index extraction processing match with each other. Because of this, at S902, it is determined that the document indicated by the scanned image is similar to the document determined at S504 of the index extraction processing. That is, it is determined that the document type of the input document 1 is the same as the document type registered in the extraction rule.

On the other hand, in a row 1704 in the table in FIG. 17, the character string indicating the index of each item, which is extracted from the scanned image of the input document 2 in FIG. 10C, is retained. As in the case of the input document 1, it is assumed that the determination of similarity with the document whose Document ID is "0001" is performed based on the character string type.

In FIG. 17, for the issuer company name (sender), which is the item of the fixed character string type, the character string of the registered document retained in details in the row 1703 is "ABC Co.". On the other hand, the character string extracted from the scanned image of the input document 2 is "LMN Co." as shown in a cell 1705. Because of this, the character strings do not match with each other despite the same fixed character string type, and therefore, it is determined that the character string type of the issuer company name (sender) does not match. Further, for the business form number (number), which is the item of the estimation type, the extracted character string does not consist of a four-digit numeric string as shown in a cell 1706, and therefore, the character string does not match with details in the row 1702. Because of this, it is determined that the character string type of the business form number (number) does not match.

As above, in a case where there is a character string whose character string type does not match with that of the document for which similarity is determined in the index extraction processing, at S902 of the present embodiment, it is determined that the document indicated by the scanned image is not similar to the document determined in the index extraction processing. That is, it is determined that the document type of the input document 2 is a type that is not included in the document types registered in the extraction rule.

It may also be possible to determine no similarity in a case where there is even one item whose character string type does not match as described above, or it may also be possible to determine no similarity in a case where the number of character string types, which is larger than or equal to a predetermined threshold value, does not match.

As explained above, in the present embodiment, the determination of similarity between the document determined in the index extraction processing and the document indicated by the scanned image is performed by utilizing the character string type of the determined index. Because of this, according to the present embodiment, even in a case where a document different from the input document but whose document layout is similar to that of the input document is registered, it is possible to recommend new registration in place of overwriting.

Other Embodiments

In the above-described embodiments, the example is explained in which the image forming apparatus 100 single-handedly performs the processing at each step of the flowchart in FIG. 4 or FIG. 5. In addition thereto, an aspect may be accepted in which another image processing apparatus on the system 105, which has the functions in FIG. 3, performs all or part of those pieces of processing.

For example, the scan processing is performed in the image forming apparatus 100 and the scanned image is transmitted to the terminal 101 via a network. The terminal 101 has the same function as that of the image processing unit 305 and the index extraction processing may be performed in the terminal 101. In this case, the terminal 101 returns the index extraction results to the image forming apparatus 100 and the image forming apparatus 100 performs file generation and file transmission based on the obtained index extraction results.

According to the technique of the present disclosure, it is possible to appropriately perform updating of information that is used for the processing to set a property of a scanned image.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-067973 filed Apr. 13, 2021, which is hereby incorporated by reference wherein in its entirety.

What is claimed is:

1. An image processing apparatus comprising:
an obtaining unit configured to obtain a scanned image obtained by scanning a document;
a first determination unit configured to determine a document type of a document format similar to a document format of the scanned image based on information on each document type registered in advance;
an extraction unit configured to extract a character string corresponding to a predetermined item for setting a property about the scanned image based on information on the document type of the scanned image determined by the first determination unit, the character string being included in the scanned image;
a second determination unit configured to determine, by using a method which is different from a method used by the first determination unit, whether the document format of the scanned image is similar to a document format of the document type determined by the first determination unit in a case where a user modifies the extracted character string; and a display control unit configured to display a screen prompting the user to instruct to perform overwriting of the information on the registered document type in a case where the second determination unit determines that the document format of the scanned image is similar to the document format of the document type determined by the first determination unit.

2. The image processing apparatus according to claim 1, wherein the first determination unit determines a document type of a document format whose degree of similarity to the document format of the scanned image is higher than a first threshold value and whose degree of similarity to the document format of the scanned image is the highest from the registered document types.

3. The image processing apparatus according to claim 2, wherein the second determination unit determines that the document format of the scanned image is similar to the document format of the document type determined by the first determination unit in a case where the degree of similarity between the document format of the scanned image and the document format of the document type determined by the first determination unit is higher than a second threshold value higher than the first threshold value.

4. The image processing apparatus according to claim 1, further comprising:

a character string type determination unit configured to determine a character string type representing a feature of a character string representing the predetermined item in each of the registered document types, wherein the second determination unit determines whether the document format of the scanned image is similar to the document format of the document type determined by the first determination unit based on the character string type.

5. The image processing apparatus according to claim 1, wherein the display control unit displays a list for the user to select the document type targeted to perform the overwriting in a case where the user performs predetermined input.

6. The image processing apparatus according to claim 5, wherein the display control unit is configured to be able to perform control so that document types narrowed based on the degree of similarity between the document format indicated by the scanned image and a document format of each of the registered document types are displayed in the list.

7. The image processing apparatus according to claim 5, wherein the display control unit is configured to be able to perform control so that document types sorted according to the degree of similarity between the document format indicated by the scanned image and a document format of each of the registered document types are displayed in the list.

8. The image processing apparatus according to claim 1, wherein the display control unit displays a screen in a state where the document type determined by the first determination unit is selected as the document type targeted to perform the overwriting in a case of displaying a screen prompting to instruct to perform the overwriting.

9. The image processing apparatus according to claim 1, wherein the display control unit display a screen prompting the user to instruct to perform new registration to register a new document type in a case where it is not possible for the first determination unit to determine a document type of a document format similar to the document format of the scanned image, or in a case where the second determination unit determines that the document format of the scanned image is not similar to the document format of the document type determined by the first determination unit.

10. The image processing apparatus according to claim 9, wherein the display control unit displays a confirmation screen on which it is possible for the user to at least select instructions to perform the overwriting or instructions to perform the new registration and the screen prompting to instruct to perform the overwriting is the confirmation screen that is set to a state where instructions to perform the overwriting are selected.

11. The image processing apparatus according to claim 9, further comprising:

a registration unit configured to perform the overwriting or the new registration in accordance with instructions of the user, wherein the registration unit registers at least position information on a text block of the scanned image as information on the document type.

12. The image processing apparatus according to claim 1, further comprising:

a detection unit configured to detect a text block included in the scanned image; and a block determination unit configured to determine a text block corresponding to the predetermined item included in the scanned image, wherein the extraction unit extracts a character string obtained by performing character recognition for a text block corresponding to the predetermined item as a character string of the predetermined item.

13. The image processing apparatus according to claim 1, wherein the display control unit presents a character string indicating the predetermined item and extracted from the scanned image and the second determination unit determines whether the document format of the scanned image is similar to the document format of the document type determined by the first determination unit in a case where the user modifies the presented character string indicating the predetermined item.

14. An image processing method comprising:

an obtaining step of obtaining a scanned image obtained by scanning a document;

a first determination step of determining a document type of a document format similar to a document format of the scanned image based on information on each document type registered in advance;

an extraction step of extracting a character string corresponding to a predetermined item for setting a property about the scanned image based on information on the document type of the scanned image determined at the first determination step, the character string being included in the scanned image;

a second determination step of determining, by using a method which is different from a method used at the first determination step, whether the document format of the scanned image is similar to a document format of the document type determined at the first determination step in a case where a user modifies the extracted character string; and a display control step of displaying a screen prompting the user to instruct to perform overwriting of the information on the registered document type in a case where it is determined at the second determination step that the document format of the scanned image is similar to the document format of the document type determined at the first determination step.

15. A non-transitory computer readable storage medium storing a program which causes a computer to perform an image processing method comprising:

an obtaining step of obtaining a scanned image obtained by scanning a document;

a first determination step of determining a document type of a document format similar to a document format of the scanned image based on information on each document type registered in advance;

an extraction step of extracting a character string corresponding to a predetermined item for setting a property about the scanned image based on information on the document type of the scanned image determined at the first determination step, the character string being included in the scanned image;

a second determination step of determining, by using a method which is different from a method used at the first determination step, whether the document format of the scanned image is similar to a document format of the document type determined at the first determination step in a case where a user modifies the extracted character string; and a display control step of displaying a screen prompting the user to instruct to perform overwriting of the information on the registered document type in a case where it is determined at the second determination step that the document format of the scanned image is similar to the document format of the document type determined at the first determination step.

\* \* \* \* \*